(12) United States Patent
Al Rawi et al.

(10) Patent No.: US 10,069,617 B2
(45) Date of Patent: Sep. 4, 2018

(54) METHOD AND APPARATUS FOR TRANSMITTING DATA FROM A TRANSMITTER DEVICE TO A PLURALITY OF RECEIVER DEVICES

(71) Applicant: BRITISH TELECOMMUNICATIONS PUBLIC LIMITED COMPANY, London (GB)

(72) Inventors: Anas Al Rawi, London (GB); Leslie Humphrey, London (GB); Trevor Linney, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/552,932

(22) PCT Filed: Mar. 2, 2016

(86) PCT No.: PCT/EP2016/054441
§ 371 (c)(1),
(2) Date: Aug. 23, 2017

(87) PCT Pub. No.: WO2016/139254
PCT Pub. Date: Sep. 9, 2016

(65) Prior Publication Data
US 2018/0034618 A1    Feb. 1, 2018

(30) Foreign Application Priority Data

Mar. 2, 2015  (EP) .................................... 15275057

(51) Int. Cl.
*H04B 3/32*        (2006.01)
*H04L 5/20*        (2006.01)
(Continued)

(52) U.S. Cl.
CPC .................. *H04L 5/20* (2013.01); *H04B 3/50* (2013.01); *H04L 25/03343* (2013.01); *H04M 11/062* (2013.01); *H04L 2025/0342* (2013.01)

(58) Field of Classification Search
None
See application file for complete search history.

(56) References Cited

U.S. PATENT DOCUMENTS

| | | | |
|---|---|---|---|
| 9,270,333 B2* | 2/2016 | Lu ............................ | H04B 3/32 |
| 2013/0208579 A1* | 8/2013 | Strobel .................... | H04B 3/32 |
| | | | 370/201 |
| 2014/0359389 A1* | 12/2014 | Seastrom ......... | H04N 21/23608 |
| | | | 714/751 |

FOREIGN PATENT DOCUMENTS

| | | |
|---|---|---|
| EP | 2 091 196 | 8/2009 |
| EP | 14 250 116.2 | 9/2014 |

(Continued)

OTHER PUBLICATIONS

International Search Report for PCT/EP2016/054441, dated Apr. 21, 2016, 3 pages.

(Continued)

*Primary Examiner* — Maria El-Zoobi
(74) *Attorney, Agent, or Firm* — Nixon & Vanderhye P.C.

(57) ABSTRACT

Apparatus for communicating data between a transmitter device 16 and a first 51 and a second 52 receiver device, the receiver devices being connected, in use, to the transmitter device via a first 21 and a second 22 pair of wires respectively. Each receiver device is operable to receive signals detected as a change over time in the potential difference across the local ends of each respective pair of wires extending between the respective receiver device and the transmitter device, and the transmitter device is operable to transmit signals onto the wires at the transmitter ends thereof in order to transmit signals via a direct differential mode to each respective receiver via its respective pair of wires. The transmitter device is additionally operable to transmit signals to both receivers via a single common indirect channel and comprises: a channel estimator 1670, 1680, 1690 for estimating the extent of coupling between the common indirect channel and each of the receiver devices based on readings received by the transmitter device from the receiver devices; and a processor 1690 for determining a plurality of weighting values in dependence upon the estimated extents of the couplings; the transmitter 16 being operable to transmit a first signal via the direct differential mode over the first pair 21, to transmit a second signal via the direct differential mode over the second pair 22 and to transmit a combined signal onto the indirect channel, wherein the (Continued)

combined signal comprises a weighted sum of the first and second signals, the weighting being done in accordance with the determined weighting values; and wherein the transmitter further comprises a precoder 1640 for precoding the first, second and combined signals to pre-compensate them for the expected effects of cross-talk from the other ones of these signals, wherein the pre-coding of each signal, including the first and the second signals, is performed in dependence upon the determined weighting values.

15 Claims, 6 Drawing Sheets

(51) Int. Cl.
*H04M 11/06* (2006.01)
*H04B 3/50* (2006.01)
*H04L 25/03* (2006.01)

(56) References Cited

FOREIGN PATENT DOCUMENTS

| WO | WO 2006/120510 | 11/2006 |
| WO | WO 2013/026479 | 2/2013 |

OTHER PUBLICATIONS

Written Opinion of the ISA for PCT/EP2016/054441, dated Apr. 21, 2016, 9 pages.
Search Report for EP 15275057.6, dated Jun. 2, 2015, 9 pages.

\* cited by examiner

METHOD AND APPARATUS FOR TRANSMITTING DATA FROM A TRANSMITTER DEVICE TO A PLURALITY OF RECEIVER DEVICES

This application is the U.S. national phase of International Application No. PCT/EP2016/054441 filed 2 Mar. 2016, which designated the U.S. and claims priority to EP Patent Application No. 15275057.6 filed 2 Mar. 2015, the entire contents of each of which are hereby incorporated by reference.

FIELD

The present invention relates to a method and apparatus for transmitting data from a transmitter device to a plurality of receiver devices, and in particular to a method and apparatus for transmitting and receiving data signals over pairs of wires. Such methods include all of the various Digital Subscriber Line (DSL) methods as specified in various International Telecommunications Union (ITU) standards and as being further developed in the ITU at present. Typically each such pair of wires comprises a twisted metallic pair (usually copper) as commonly found within telephone access networks throughout the to world.

BACKGROUND

DSL technology takes advantage of the fact that although a legacy twisted metallic pair (which was originally installed to provide merely a Plain Old Telephone Services (POTS) telephony connection) might only have been intended to carry signals using differential mode at frequencies of up to a few Kilohertz, in fact such a line can often reliably carry signals at much greater frequencies. Moreover, the shorter the line, the greater is the range of frequencies over which signals can be reliably transmitted (especially with the use of technologies such as Discrete Multi-Tone (DMT), etc.). Thus as access networks have evolved, telecommunications network providers have expanded their fibre optic infrastructure outwards towards the edges of the access network, making the lengths of the final portion of each connection to an end user subscriber (which is still typically provided by a metallic twisted pair) shorter and shorter giving, rise to correspondingly greater and greater bandwidth potential over the increasingly short twisted metallic pair connections-without is having to bear the expense of installing new optic fibre connections to each subscriber. However, a problem with using high frequency signals is that a phenomenon known as crosstalk can cause significant interference reducing the effectiveness of lines to carry high bandwidth signals in situations where there is more than one metallic pair carrying similar high frequency signals in close proximity to one another. In simple terms, the signals from one pair can "leak" onto a nearby line (which may be carrying similar signals) and appear as noise to the other line. Although cross talk is a known problem even at relatively low frequencies, the magnitude of this effect tends to increase with frequency to the extent that at frequencies in excess of a few tens of Megahertz (depending on the length of the lines in question), the indirect coupling (e.g. from a near end of a second line to a remote end of a first line) can be as great as the direct coupling (e.g. from the near end of the first line to the remote end of the first line).

In order to alleviate the problems caused by cross talk (especially Far End Cross Talk or "FEXT" as it is known) a technology known as vectoring has been developed in which knowledge of the signals sent over crosstalking lines is used to reduce the effects of the crosstalk. In a typical situation a single DSLAM acts as a co-generator of multiple downstream signals over multiple cross-talking lines and also as a co-receiver of multiple upstream signals from the same multiple cross-talking lines, with each of the lines terminating at a single Customer Premises Equipment (CPE) modem such that no common processing is possible at the CPE ends of the lines. In such a case, downstream signals are pre-distorted to compensate for the expected effects of the cross-talking signals being sent over the neighbouring cross-talking lines such that at reception at the CPE devices the received signals are similar to what would have been received had no cross-talking signals been transmitted on the cross-talking lines. Upstream signals on the other hand are post-distorted (or detected in a manner equivalent to their having been post-distorted) after being received at the co-receiver (the DSLAM) in order to account for the effects of the cross-talk which has leaked into the signals during their transmission.

WO02013026479 applied for by Ericsson proposes a method of transmitting signals, in such a situation (i.e. where an indirect coupling is comparable to a direct coupling for a given line), which involves transmitting signals intended for reception by a single CPE device (a first CPE device) onto both the line directly coupled to the first CPE device and onto a crosstalking line coupled only indirectly to the first CPE device (it being directly coupled to a second CPE device). A Time Division Multiplexing (TDM) method is used to enable data to be sent (in different time slots) to the two respective CPE devices (with data being sent over both wires at the same time to only one of the CPE devices at a time). In order to ensure that the two signals constructively interfere at the receiving CPE device, the same signal as sent over one line is pre-distorted (e.g. to introduce a delay and/or phase change) before being sent over the other to account for differences in the directly vs the indirectly coupled paths.

In addition, transmission mode uniqueness is not guaranteed when multiple conductors are in close proximity. In fact, it has been demonstrated that multi-mode co-existence is inevitable in multi-conductor environments. Intuitively, the average voltage potentials of the pairs at a specific frequency are very unlikely to be equal. Due to this, the voltage potential between pairs starts to move in additional differential circuits formed from multiple pairs in a similar fashion to those in twisted metallic wires pairs. These additional modes/circuits are known as phantom modes. Additionally, it is possible for signals to travel over one or more wires with reference to a fixed common ground (earthed) potential, and such modes are referred to as common modes of transmission. The presence of additional modes, e.g. common/phantom or mixed modes, allows mode conversion continuously coupling signals (often destructively) in each mode. Unlike crosstalk between pairs, signals over mode conversion crosstalk cannot be corrected or controlled without a physical access to these interfering modes. Moreover, it is worth noting that phantom modes propagate over untwisted pairs. Hence, phantoms radiate (cross-couple) higher crosstalk levels than in ordinary pairs (which are twisted). Therefore, the differential mode suffers from energy dissipation under uncontrolled multi-mode channel environment especially at high frequencies.

EP2091196 by Alcatel-Lucent provides a method to inject signals into the phantom mode formed between two Twisted Metallic Pairs (TMPs). The injected signals are the same as those sent onto one of the TMPs, but phase-rotated so that when converted and coupled into the differential mode, they interfere constructively with the signals sent directly over the respective one of the TMPs in the normal differential mode. However, EP2091196 does not consider how to exploit this technique in more general circumstances where there is more than one possible phantom mode available (i.e. where there are more than two TMPs). Furthermore, EP 2091196 does not address any power constraint implications of the arrangement.

WO2006/120510 describes a method for superimposing phantom-mode signals onto multiple wire pair connections in order to reinforce existing differentially driven DSL downstream signals in a vectored binder of DSLs. The method is carried out by treating each pair as a common-mode antenna with respect to earth ground, with some pairs selectively excited at the transformer centre tap at the transmit end with respect to a common (earth or chassis) ground reference while corresponding receivers on other non-excited pairs sense the signals between their centre taps and a ground at the opposite ends of the lines to the exciting transmitters. A dual use with hybrid circuits allows the receiving circuit to also have an upstream transmitter and an upstream-sensing receiver on the centre tap of the opposite side of an adjacent wire.

ITU-T: "DRAFT RECOMMENDATION ITU-T G.993.5 SELF-FEXT CANCELLATION (VECTORING) FOR USE WITH VDSL2 TRANSCEIVERS", pages 1-80, 22 Apr. 2010, describes a single method of self-FEXT cancellation, in which FEXT generated by a group of near-end transceivers and interfering with the far-end transceivers of that same group is cancelled by either pre-coding or post-coding to compensate for the expected effects of cross talk from other transceivers in the same group using knowledge of the signals transmitted by the other transceivers in the group together with measure knowledge of the cross-talk channel transfer functions.

SUMMARY

According to a first aspect of the present invention, there is provided a method of transmitting data from a transmitter device to a first and a second receiver device, the receiver devices being connected to the transmitter device via a first and a second pair of wires respectively, each receiver device being operable to receive signals detected as a change over time in the potential difference across the local ends of each respective pair of wires extending between the receiver and the transmitter device, the transmitter device being operable to transmit signals onto the wires extending between the transceiver device and the receiver devices in order to transmit signals via a direct differential mode to each respective receiver, and is additionally operable to transmit signals to both receivers via a single common indirect channel (which in some embodiments might be a phantom mode channel or else a third pair of wires with a non-negligible cross talk coupling to both receivers), the method comprising: measuring the extent of coupling between the common indirect channel and each of the receiver devices, determining a plurality of weighting values in dependence upon the measured extent of the couplings, transmitting a first signal via the direct differential mode over the first pair and a second signal via the direct differential mode over the second pair and transmitting a combined signal onto the indirect channel, the combined signal comprising a weighted sum of the first and second signals, the weighting being done in accordance with the determined weighting values, and wherein the first, second and combined signals are all pre-coded, prior to being transmitted, in order to pre-compensate for the expected effects of crosstalk coupling from the other signals, the pre-coding being performed using predetermined pre-coding coefficients, and wherein the pre-coding coefficients for all three signals are calculated in dependence upon the determined weighting values.

In this way, it is possible for a single common indirect channel to be used to benefit both receivers simultaneously by using weighting values between 1 and 0. It is also possible to use different weighting values for different tones. In this way the different extent of the couplings at different frequencies can be taken into account and exploited to maximise the total benefit to the two receivers (e.g. for tones where a stronger coupling is in place for the first receiver compared to the second a bigger weighting can be given to the first signal (possibly even a weighting of 1 for say the first signal and zero for the second signal—implying that the combined signal for such tones is composed entirely of the first signal) whilst for tones where the coupling is stronger with the second receiver the weightings can be reversed to give a greater weighting to the second signal, etc.). Moreover, the weighting can be determined in order to satisfy a number of different objectives—e.g. to provide greater assistance to a poorly performing line, or to maximise the total performance of both lines in combination, etc.

By performing the pre-coding in a way which takes into account whatever weighting values have been pre-determined (based on the extent of the couplings—i.e. the magnitudes of the relevant channel transfer functions—and the objective (which may be implicit but which is preferably explicitly user specifiable) to be achieved—e.g. maximising total capacity of the set of lines or ensuring at least a minimum level of performance for both lines, etc.) the lines can pre-compensate for the expected effects of cross talking from all other signals—including the combined signal (in particular the component of the signal which is not benefitting the line whose signal is being pre-coded—e.g. signal 1 on line 1 can be precoded to pre-compensate for the expected cross talk from the combined signal including a weighted component of signal 2 as well as from the signal 2 itself from line 2).

Preferably, the weighting values are additionally determined in dependence upon the instantaneous level of demand for data to be transmitted to a respective receiver. It is most preferred if the transmitter devices and the receiver devices are operating in accordance with a physical layer retransmission scheme whereby a receiver requests retransmission of received data which is irreparably damaged because of errors in the received signals (and/or the detected and/or recovered data upon receipt). In such a case, it is preferred if the demand used in determining the weighting values reflects the demand for physical layer re-transmission of data caused by such errors. In this way, higher layers (e.g. data link, network, transport, application layer protocols) can be offered higher consistent data rates with less overhead (and less potential buffering) required for physical layer retransmissions (to be built into the offered consistent rate to higher layers) because the bandwidth needed for these physical layer retransmissions can be allocated from the extra capacity associated with the use of the common indirect channel on an on-demand basis.

Preferably the weighting values are re-determined on a relatively frequent basis such as of the order of between once every few seconds to several times per second. Most preferably, this is achieved by monitoring relevant metrics such as channel transfer function estimations and user demand levels (or estimations thereof) and re-determining the weighting values and resulting pre-coding coefficients (possibly on a tone-by-tone basis especially where a channel transfer function estimation indicates a significant change only in respect of a subset of the tones in use) only if the monitoring indicates a change above a certain predetermined threshold has occurred. By careful setting of the size of such a threshold the rate at which weighting values are re-determined can be optimised (to balance load on the processor against the closeness with which changes in the channels/demand are followed). This can enable changes in demand for bandwidth for the transmission of data to the different receivers to be accommodated in a short period of time and consequently enables buffers at the transmitter associated with retransmission protocols to be cleared to as quickly as possible. For example, physical layer retransmission performed in accordance with ITU recommendation G.998.4 uses a queue of Data Transmission Units (DTUs) for retransmission which is cleared as acknowledgements of receipt of DTUs are received at the transmitter and weighting values could therefore be changed in preferred embodiments of the present invention in dependence upon the size of these queues in respect of the different receivers to which the DTU's are destined.

Preferably the channel transfer functions are estimated on a regular basis and the weighting values and/or precoding coefficients are recalculated in the event that the channel transfer functions are determined to have changed by more than a predetermined amount since the weighting values and/or precoding coefficients were last calculated (or recalculated).

As mentioned above, the weighting values are used not only to affect the signal which is transmitted onto the common indirect channel, but are also used to affect the first and second signals since the extent of precoding required to accommodate distortion caused by cross-talk varies in dependence upon these weighting values. In other words, it is preferred if the first signal is generated in dependence upon (at least): user data to be transmitted to the first receiver, channel estimations of the respective direct channel between the transmitter and the first receiver, channel estimations of the indirect channel between the direct channel between the transmitter and the second receiver on the one hand and the first receiver on the other hand, channel estimations between the common indirect channel on the one hand and the first receiver on the other hand, and on the determined weighting values. The second signal is preferably similarly dependent upon corresponding factors mutatis mutandis.

Preferably, the manner in which the weighting values are used to affect the first and second signals (and any other signals for direct transmission to a predetermined receiver via a direct differential mode channel) and the manner in which the (or each) combined signal is generated for transmission over a common indirect channel (or multiple indirect channels) is performed in such way that by assigning zero to all of the weighting values for a particular tone, the method reverts to standard vectoring (for any such tone) in which signals (the first and second signals) are transmitted only onto the direct differential mode channels, and those signals are pre-coded to pre-compensate for the expected cross-talk effects of the signal being transmitted onto the other direct differential mode channel (or channels) associated with the respective other pair (or pairs) of wires.

It should be noted that embodiments of this aspect of the present invention permit more than two receivers to be coordinated within a coordinated group and moreover permit more than one common indirect channel to be employed. One particularly advantageous embodiment involves the use of multiple different types of indirect channels to be used. In particular, some embodiments may use one or more phantom mode channels over a first set of tones and a combination of phantom modes and differential-mode crosstalk channels (e.g. channels where the normal direct differential channel is not used directly at some tones) across a second set of tones, wherein the second set of tones is generally smaller than the first set. A particularly advantageous application of such an embodiment is where one of the receivers is not capable of receiving tones above a certain cut-off frequency (perhaps because it is configured to operate in accordance with a DMT mode which only employs tones up to a certain maximum frequency which is below the maximum frequency which can be used in accordance with a different mode of DSL—for example, many VDSL2 modems (using profiles 12a or 12b for example) can use tones up to 12 MHz whereas most ADSL2+ modems only use tones up to 2.2 MHz); thus, in an example such case, a third receiver might be an ADSL2+ modem which is only configured to receive tones up to 2.2 MHz whereas the first and second receivers could be VDSL2 modems able to receive tones up to 12 MHz. In this case for tones in excess of 2.2 MHz can be used for the benefit of the first and second receivers (since they are of no benefit to the third receiver) whilst a phantom mode channel can be exploited at all downstream tones, etc.).

Some brief discussion of what is meant by a common indirect channel may be useful. As per embodiments described below, this can include an unterminated (single ended) phantom channel formed across centre tap voltages of two different twisted metallic pairs. Since this channel is unterminated (since it is not possible to simultaneously measure and co-process the centre tap voltages of the respective TMP's at the customer premises ends receivers in general (since in general these will be in quite distinct geographical locations)) the "common" channel is in fact only common for part of the channel since it terminates at different locations for the different receivers; nonetheless it is common in the sense that at least one end of the channel is common between different receivers and the same (combined) signal is propagated onto that common part of the channel. Moreover, in general, where it states above (and elsewhere in the present description) that a channel is between a first channel and a second channel, what is actually meant of course is the channel between the transmission from the transmitter onto the transmitter end of the first channel and the reception at the receiver at the receiver end of the second channel, and similarly where reference is made to a channel between a first channel and a receiver what is actually meant is the channel from the transmitter via the transmitter end of the first channel to the receiver, etc. In some embodiments, the common indirect channel may be a (possibly also unterminated/single-ended) Twisted Metallic Pair (TMP). Single-ended/unterminated TMP's can arise where a spare TMP extends to a customer premises as part of a pair of TMP's even though only one of these pairs is actually terminated (and therefore connected at both of its ends to telephony equipment).

The method can of course be extended to more than two receivers where there is a common, indirect channel which cross-couples onto all of the respective lines. Additionally, the method can be used such that say receivers one and two benefit simultaneously from a common transmission over a first indirect channel and receivers two and three benefit simultaneously from a transmission over a second indirect channel, such that the second receiver benefits simultaneously from two separate indirect channels, etc. Other manners of using embodiments of this fifth aspect of the present invention will occur to persons skilled in the art based on the above examples.

Further aspects of the present invention relate to processor implementable instructions for causing a processor to carry out the method of the first aspect of the present invention and/or for causing a processor to operate as a phantom channel selector device in accordance with the fourth aspect of the present invention; aspects of the invention also relate to carrier media, preferably non-transient, tangible media such as volatile or non-volatile solid state storage media (e.g. USB thumb drives etc.), magnetic storage media such as a hard drive, or optical storage media such as a CD or DVD, etc.; carrying such processor implementable instructions as mentioned above.

Aspects of the present invention additionally relate to a suitable apparatus for performing the method according to the first aspect of the present invention, in particular to a transmitter device for transmitting data from the transmitter device to a first and a second receiver device, the receiver devices being connected, in use, to the transmitter device via a first and a second pair of wires respectively, each receiver device being operable to receive signals detected as a change over time in the potential difference across the local ends of each respective pair of wires extending between the respective receiver device and the transmitter device, the transmitter device being operable to transmit signals onto the wires extending between the transmitter device and the receiver devices in order to transmit signals via a direct differential mode to each respective receiver via its respective pair of wires, and is additionally operable to transmit signals to both receivers via a single common indirect channel, the transmitter comprising: a channel estimator for estimating the extent of coupling between the common indirect channel and each of the receiver devices based on readings received by the transmitter device from the receiver devices; and a processor for determining a plurality of weighting values in dependence upon the estimated extents of the couplings; the transmitter being operable to transmit a first signal via the direct differential mode over the first pair, to transmit a second signal via the direct differential mode over the second pair and to transmit a combined signal onto the indirect channel, wherein the combined signal comprises a weighted sum of the first and second signals, the weighting being done in accordance with the determined weighting values; and wherein the transmitter further comprises a precoder for precoding the first, second and combined signals to pre-compensate them for the expected effects of cross-talk from the other ones of these signals, wherein the pre-coding of each signal, including the first and the second signals, is performed in dependence upon the determined weighting values.

According to a second aspect of the present invention, there is provided a method of transmitting data from a transmitter device to a plurality of receiver devices, each of which is connected to the transmitter device via at least one respective pair of wires, each receiver device being operable to receive signals detected as a change over time in the potential difference across the local ends of each respective pair of wires extending between the receiver and the transmitter device, the transmitter device being operable to transmit signals onto the wires extending between the transmitter device and the plurality of receiver devices in a plurality of different modes, over a plurality of different channels, the different modes including phantom and differential modes and the different channels including a first set of phantom channels, the method comprising selecting a second set of phantom channels from the first set, the second set being a proper subset of the first set comprising one or some of the phantom channels of the first set (but not all the phantom channels of the first set), the selection being made in dependence upon the cross-talk coupling between the phantom channels of the first set and the reception of signals at each of the receivers detected as a change over time in the potential difference across the local ends of the (or each) respective pair of wires extending between the respective receiver and the transmitter device, connecting the selected phantom channels to the transmitter and transmitting signals from the transmitter onto the (thus selected and connected) phantom channels of the second set of phantom channels.

It will be apparent that this second aspect enables some lines to have their signals strengthened such that improvements can result in their data connection (e.g. data rate can be improved, errors can be reduced, latency may be reduced in some circumstances, etc.) and moreover that such improvement can be optimised for a specific desired line or lines to be optimised. It will be apparent to the skilled reader that where it says "reception" of the signals at each of the receivers detected as a change over time in the potential difference across the local ends of the (or each) respective pair of wires extending between the respective receiver and the "transmitter" it is clearly conveying the idea that the signals are received at each receiver in the normal differential mode. Although the second aspect of the invention does not exclude the possibility that the determination of which phantom channels to employ is based upon other more complex considerations (in addition to the simpler consideration of the crosstalk coupling strengths between the various possible phantom channels and the various differential mode channels as detected at the receivers), by basing the analysis at least upon this latter type of coupling, it is possible for conventional receivers, which are only capable of receiving signals via the differential mode in respect of a single twisted metallic pair, to be used in the first aspect of the invention. This is important because it means that all of the complex functionality for implementing certain preferred embodiments of the invention can reside in the access network (e.g. at an Access Network Node (ANN) or Digital Subscriber Line Access Multiplexor (DSLAM), etc.) rather than requiring any special Customer Premises Equipment (CPE), in certain preferred embodiments of the invention.

In certain preferred simple embodiments, a special training procedure is used in which signals are transmitted into only a single phantom channel (at any one time) for a given set of receivers (the given set of receivers being typically chosen based on some assessment of their likelihood to crosstalk interfere with one another at frequencies of interest for DSL (including G.FAST) communications with one another—i.e. frequencies which the transmitter and receiver are capable of using successfully and which the transmitter and receiver (or at least one or some of the given set of receivers) are permitted to use under local regulations). Each receiver can then measure properties of the received training signals and feed these back to the transmitter in the normal manner to thus obtain information about the crosstalk coupling between the single used phantom channel on which the training signals were transmitted and each of the normal differential mode channels as detected at each respective receiver. By repeating this training procedure multiple times using different single phantom mode channels it is possible to obtain comprehensive information about the crosstalk coupling between each such phantom mode channel and each direct differential mode channel terminating at the receivers of the given set of receivers. This information can then be used to assist in the appropriate selection of which phantom mode channels to use during "showtime" operation of the transmitter and receivers during normal DSL communications.

Throughout this specification reference will be made to modes of communication. In this specification the term "mode" is used to indicate the nature of the manner in which signals are transmitted between transmitter and receiver. In particular, as will be appreciated by persons skilled in the art, there are three principal such modes of communication: differential mode, phantom mode and common mode. In all three of these modes the signal is transmitted (excited) and received (observed) as the (changing) potential difference (voltage differential) between two voltages (or equivalently between one "live" voltage and one "reference" voltage). In the differential mode the signal is transmitted/observed as the difference in potential between two wires (typically between two wires of a twisted metallic pair). In the phantom mode at least one of the voltages is the average voltage of a pair of wires (note that such average can vary without impacting on a signal carried in the differential mode across that same pair of wires—in this sense the phantom mode can be orthogonal to signals carried in the differential mode if carefully chosen); the term pure phantom mode may be used to specify that both voltages being compared with each other are average voltages, each average voltage being the average or common voltage of at least one pair of wires. Second and higher order phantom modes can also be obtained by using the average voltage of two or more average voltages as one of the voltages to be compared, etc. Finally, the common mode refers to the case where one of the voltages being compared is the "Earth" or ground reference voltage (or something substantially similar for telecommunications purposes). Naturally, it is possible for various mixed modes to also be used for carrying signals—e.g. one reference voltage could be a common ground and the other could be the average between the voltages of two wires in a twisted metallic pair (to generate a mixed mode of phantom and common modes)—however, in general, reference to a differential mode in this specification is used to refer to a pure differential mode—i.e. it does not include any phantom or common mode component so a mode comprising a comparison between the voltage on a single wire and the average voltage between the voltages of two other wires may be referred to as an impure phantom mode rather than a mixed phantom and differential mode, etc.

Preferred embodiments of the present invention are primarily concerned with the intelligent usage of pure phantom modes, and so in general reference to a phantom mode will mean such a pure phantom mode be it first or second or higher order, etc. unless explicitly specified otherwise.

Reference is also made throughout this specification to direct and indirect coupling and direct and indirect channels.

A direct channel is one in which the same physical medium and the same mode of transmission is used for both the transmission of the signal and for the reception of the signal. Thus a normal differential mode transmission across a single twisted metallic pair from transmitter to receiver would constitute a direct (differential mode) channel between the transmitter and the receiver.

By contrast, a channel in which the transmitter transmitted a signal onto a second twisted metallic pair in differential mode but was received by a receiver from a first twisted metallic pair in differential mode (the signal having "crosstalked" across from the second to the first pair) is an example of an indirect channel, as is a case in which a signal is transmitted by a transmitter in a phantom mode across the averages of the voltages of the wires in each of a first and second TMP and received (having "crosstalked/mode converted") by a receiver connected to just the first TMP in differential mode. Many embodiments described below use such phantom channels which may hereinafter be referred to as single-ended (or unterminated) phantom channels (since they can only be directly excited—or observed—at one end of the channel—namely, at the Access Node (AN) side, the signals carried over such phantom channels only being received at a CPE device to the extent that they have crosstalked/mode converted onto a differential mode channel).

Moreover, where there are multiple pairs emanating from a single transmitter (e.g. an Access Node (AN) or DSLAM, etc.) in such a way that multiple direct and indirect channels are formed between the transmitter and multiple receivers, the set of twisted metallic channel pairs and their derivative channels (direct and indirect and of various different modes) can be considered as forming a "unified" dynamic shared or composite channel over which a number of virtual channels may be overlaid (i.e. the virtual channels are overlaid over the underlying common shared channel). In this context, a virtual channel can be considered as an overlay channel by which data can be directed to individual receivers even though a single common underlying signal is transmitted onto the underlying common channel; this can be achieved for example by means of a suitable multiple access technique such as Frequency Division Multiple Access (FDMA), Code Division Multiple Access (CDMA), Time Division Multiple Access (TDMA) or simply be using suitable encryption techniques, etc. It is interesting to observe, however, that this "common" shared channel is comprised of several different sub-channels which combine together at each receiver/transmitter device (for example a single direct path channel over a twisted metallic pair directly connecting the transmitter to the respective receiver, and one or more indirect, cross-talk paths (possibly also involving mode conversions) of both the differential and the phantom modes from the transmitter to the receiver via at least one twisted metallic pair which is connected between the transmitter and another of the receivers). For this reason, the dynamic "unified" shared channel is henceforth termed a composite channel comprising a composition of single-mode direct/indirect couplings/sub-channels and mixed-mode indirect couplings/sub-channels.

European patent application No. 14 250 116.2 filed by the present applicant on 30, Sep. 2014 (BT ref A32607), the contents of which are hereby incorporated, by way of reference, into the present application in their entirety, describes a technique for efficiently exploiting such a common unified channel using virtual overlay channels. Some embodiments of the present invention combine the teachings of the present invention application with the teachings of the earlier application. In particular, the techniques of the second aspect of the present invention are utilised to determine which phantom mode channels to use and then these are used together with other channels to form a common unified channel (including the selected phantom modes) over which a single common signal is transmitted with a suitable multiple access technique being used to provide overlaid virtual channels.

This composite channel (generally) consists of at least two modes: differential and phantom modes. In special scenarios, the common mode can be harnessed and treated in a similar fashion to form additional sub-channels. In the differential mode, the twisted pairs are made of differential electrical circuits to enable the direct physical link between a transmitter (DPU/DSLAM) and a receiver modem. The co-existence of multiple twisted pairs in the binder ignites mutual coupling which results in immediate and continuous energy dissipation from one pair into others.

Phantom channels can be constructed from different combinations of twisted pairs. For instance, a first and a second TMP can together generate a single unique phantom channel which has a similar behaviour to that of each directly coupled differential mode channel formed across each pair in terms of channel directivity. However, phantom modes, as mentioned earlier, are due to the variation of the average voltages of the pairs. For more than two coupled pairs, the pairs may couple to each other in the phantom mode in various orthogonal and non-orthogonal manners, e.g. 2 distinct (but non-orthogonal) phantom mode channels may be exploited which share one common pair. Preferred embodiments of the invention select and construct only orthogonal phantom channels. This minimises complex interference effects between the lines whilst still providing significant improvements to the lines being targeted for improvement.

Embodiments of the present invention are based on modelling (so that it can also be solved) the problem of phantom selection and connection to a transmitter (which combined process may hereinafter be referred to as phantom construction) as a multi-objective optimisation problem (hereinafter referred to as PC-MOP standing for Phantom Construction—Multi-objective Optimisation Problem). The target of this optimisation problem is to obtain an optimal (or at least good) set of orthogonal phantom combinations to maximise the mode conversion crosstalk onto all pairs. In some preferred embodiments, a Pareto method is employed to determine the Pareto front which contains the best (or at least good or close to the best) phantom tree access strategy. The optimisation problem can also be biased or weighted to benefit a specific pair, e.g. worst pairs. In DSL environments, the Pareto front can be calculated only once (or at least relatively infrequently) since the channel behaviour is considered stationery (or almost stationary). Once the phantom channels have been selected, an analysis is preferably performed to determine an exploitation strategy in time, frequency and space which achieves a certain predetermined objective which, in a preferred embodiment, may include (or consist of) maintaining fairness constraints between active users. This approach is advantageous because it gives the network operator a degree of flexibility over how to improve the performance of certain lines (e.g. to improve lines operating relatively poorly with high errors or high latency or low data rates, etc.).

Single mode crosstalk exploitation (e.g. from TMP 2 differential mode (at transmitter) to TMP 1 differential mode at receiver 1) is less complex than exploiting a phantom mode to differential mode indirect channel because the single mode crosstalk channels do not need to be constructed in the way that phantom mode channels must be. The fundamental issue with single mode crosstalk channels (e.g. from TMP2 to TMP1) is that once a differential mode crosstalk channel is occupied for data transmission at a specific spectrum, e.g. vectored spectrum, the user associated with the direct path of that crosstalk channel (e.g. user 2 at the receiver end of TMP 2) becomes inactive, meaning that the vectored spectrum is neglected (even though it might in fact be in demand). Therefore crosstalk channel allocation can be carried out in a time/frequency division multiple access (F/TDMA) fashion when lines are not in use as in WO2013026479. In certain preferred embodiments of the present invention however, the crosstalk transmission knowledge is capable of being exploited in multiple different ways, depending upon circumstances and the desired outcome, using techniques such as the prior art techniques known from WO0213026479 in addition to the techniques taught in the present specification. For example crosstalk channels can be exploited at some frequencies using a TDMA approach whilst at other frequencies a Code Division Multiple Access (CDMA) technique could be employed instead. Moreover, the frequencies at which such different techniques are employed can also be changed over time to suit differing requirements, etc. This provides great flexibility to the system and gives the ability to network operators to dynamically adjust the properties of connections to respond to changes in demand or external noise environments etc.

In addition, some preferred embodiments of the invention employ a method to share a crosstalk channel spatially to benefit multiple (or all) active lines (crosstalk coupled to each other) at a given frequency, simultaneously. This may be done by employing a common optimisation framework for both phantom channels and crosstalk channels except that the single-ended phantom channels are allowed to be exploited over any frequency without any restriction while crosstalk channels are only exploited in the diversity region of the channel above a critical frequency (at which it becomes more efficient to use methods such as those described in EP 14 250 116.2 referred to above by which the connections between transmitter and receivers are treated as a single common unified channel) except for unused/inactive lines (which are exploited without restriction in the same way as phantom mode channels). Therefore, some embodiments of the invention provide a complete utilisation framework for indirect channels over distinct different spectrum regions, i.e. vectored, crosstalk and phantom mode transmissions, to enable simultaneous dynamic access. (Also note that direct paths may also be optimised in some preferred embodiments of the present invention.) This approach again provides great flexibility of the system to the network operator to adjust the operation of the lines to account for changes in demand or changes in the noise environment within which the system is operating, etc.

An example preferred method utilising the above ideas is therefore a method in accordance with the first aspect of the present invention in which an indirect channel which is formed from a direct differential mode of transmission over a pair of wires connected between the transmitter device and a third receiver device is used to transmit a combined signal comprising a weighted sum of the first and second signals at a tone which is not used for transmissions between the transmitter and the third receiver but is used for transmissions between the transmitter and the first and second receivers.

Further aspects of the invention relate to a transmitter for carrying out the method of the second aspect of the invention. In particular, a third aspect of the present invention provides a transmitter for transmitting data to a plurality of receiver devices, each of which is connected to the transmitter device via at least one respective pair of wires, each receiver device being operable to receive signals detected as a change over time in the potential difference across the local ends of each respective pair of wires extending between the receiver and the transmitter device, the transmitter device being operable to transmit signals onto the wires extending between the transceiver device and the plurality of receiver devices in a plurality of different modes, over a plurality of different channels, the different modes including phantom and differential modes and the different channels including a first set of phantom channels, the transmitter comprising a phantom channel selector for selecting a second set of phantom channels from the first set, the second set being a proper subset of the first set comprising one or some of the phantom channels of the first set (but not all the phantom channels of the first set), the selection being made in dependence upon the cross-talk coupling between the phantom channels of the first set and the reception of signals at each of the receivers detected as a change over time in the potential difference across the local ends of the respective pair of wires extending between the respective receiver and the transmitter device; and a connector for connecting the selected phantom channels to the transmitter such that the transmitter is able to transmit signals from the transmitter onto the (thus selected and connected) phantom channels of the second set of phantom channels.

It should be noted that described embodiments are couched in terms of the downstream direction of data only (i.e. from an Access Node/DSLAM to Customer Premises Equipment (CPE) devices)—e.g. by referring to a transmitter rather than a transceiver, etc. However, in a practical implementation the "transmitter" of the second aspect of the present invention also, naturally, functions as a receiver for upstream transmissions from the various CPE devices (which are also therefore in practice operating as transceivers rather than just receivers). However, embodiments of the invention described herein may operate in an entirely conventional manner in the upstream direction and not exploit phantom channels in the transmission or reception of upstream signals such that discussion of the upstream aspects would be superfluous and not greatly assist the reader in understanding the operation of embodiments of the present invention.

A fourth aspect of the present invention relates to a phantom channel connector for connecting a transmitter device to a selected set of phantom channels carried over a plurality of pairs of wires extending between the transmitter and a plurality of receiver devices, the phantom channel connector comprising: a phantom channel selection signal receiver for receiving a phantom channel selection signal specifying a set of one or more (selected) phantom channels, the set of selected phantom channels comprising a subset of the total number of possible phantom channels to which the connector is operable to connect to the transmitter, a set of one or more pairs of input terminals, each pair of input terminals being operable to receive a transmission signal for transmission over an associated selected phantom channel; a switch arrangement; and a plurality of phantom mode driving couplers for electrically coupling a voltage signal output from the switching arrangement to a pair of wires in a manner suitable for driving a component voltage of a phantom mode signal over the pair of wires; wherein the switching arrangement is operable to selectively couple the or each of one or more of the input terminals to any one of (at least a plurality of) the output terminals in dependence upon the received phantom channel selection signal such that, in use, a transmission signal applied to a pair of input terminals is capable of being transmitted over a selected phantom channel in dependence upon the received phantom channel selection signal.

The term "component voltage of a phantom mode signal" is intended to refer to a single one of the two voltage points required to establish a potential difference, the variation of which over time can give rise to a voltage transmission signal. In a simple case of a first order phantom signal such a component voltage may be the average of the voltage between the two wires within a single twisted metallic pair of wires; however, for a second order phantom signal a component voltage would be the average of the average voltages of the two wires within two distinct two wire pairs, etc. Preferably, therefore, the driving couplers comprise centre tap connections to an inductor or transformer connected to a pair of wires at the transmitter end of the wires. This provides a simple and robust manner of accessing the first order phantom channels of the attached twisted metallic pairs. In other words, the phantom mode driving couplers are operable to electrically couple a voltage signal output from the switching arrangement to a plurality of pairs of wires in a manner suitable for driving a phantom mode signal over the pairs of wires.

The phantom channel connector of the fourth aspect of the present invention not only permits a selected phantom channel or channels to be exploited for the benefit a particular CPE device or devices, additionally, it allows different such phantom channels to be selected quickly and easily based on a received phantom channel selection signal. This not only assists in selecting an appropriate phantom channel to use in any particular given circumstances, but also enables phantom channels to be selected individually for training purposes as well as in sets for use once training has completed, etc.

A fifth aspect of the present invention relates to a phantom channel selector device, which may either be a part of a transmitter device (such as, for example, the transmitter device according to the third aspect of the present invention) or else be communicably attached thereto, and which is operable to select, from a first set of possible phantom channels, a second set of selected phantom channels, the second set being a proper subset of the first set, the second set comprising one or more phantom channels carried over a plurality of pairs of wires, each of which pair of wires extends between the transmitter device and one of a plurality of receiver devices, on to each of which selected phantom channel the transmitter device is to transmit a transmission signal, the phantom channel selector device comprising: a coupling data receiver for receiving receiver signal reception data and/or cross channel coupling data; a selection interface for communicating a phantom channel selection signal or message to a phantom channel connector (such as, for example the phantom channel connector according to the third aspect of the present invention), and a processor arranged to generate a phantom channel selection for communication to the phantom channel connector within the phantom channel selection signal or message in dependence upon the received signal reception data and/or cross channel coupling data.

Preferably, the processor is operable to generate the phantom channel selection by solving a pareto-based multi-objective optimisation problem.

Thus in a preferred embodiment, there is provided a phantom channel selector device, forming part of a transmitter device, the phantom channel selector device being operable to select a plurality of phantom channels carried over a plurality of pairs of wires extending between the transmitter and a plurality of receiver devices on to which to transmit a transmission signal or signals, the phantom channel selector device comprising: a coupling data receiver for receiving receiver signal reception data and/or cross channel coupling data; a selection interface for communicating a phantom channel selection signal and/or message to a phantom channel connector (such as the phantom channel connector according to the third aspect of the present invention), and a processor arranged to generate a phantom channel selection for communication to the phantom channel connector within the phantom channel selection signal and/or message in dependence upon the received signal reception data and/or cross channel coupling data and the phantom channel selection signal and/or message.

Preferably, the phantom channel selector device further comprises a multi-objective problem processing unit for performing a determination of which phantom channels to select as the solution of a multi-objective problem in which a solution is sought to simultaneously benefit two or more of the receivers.

BRIEF DESCRIPTION OF THE DRAWINGS

In order that the present invention may be better understood, embodiments thereof will now be described with reference to the accompanying drawings in which.

SPECIFIC DESCRIPTION OF EMBODIMENTS

Figure 1:
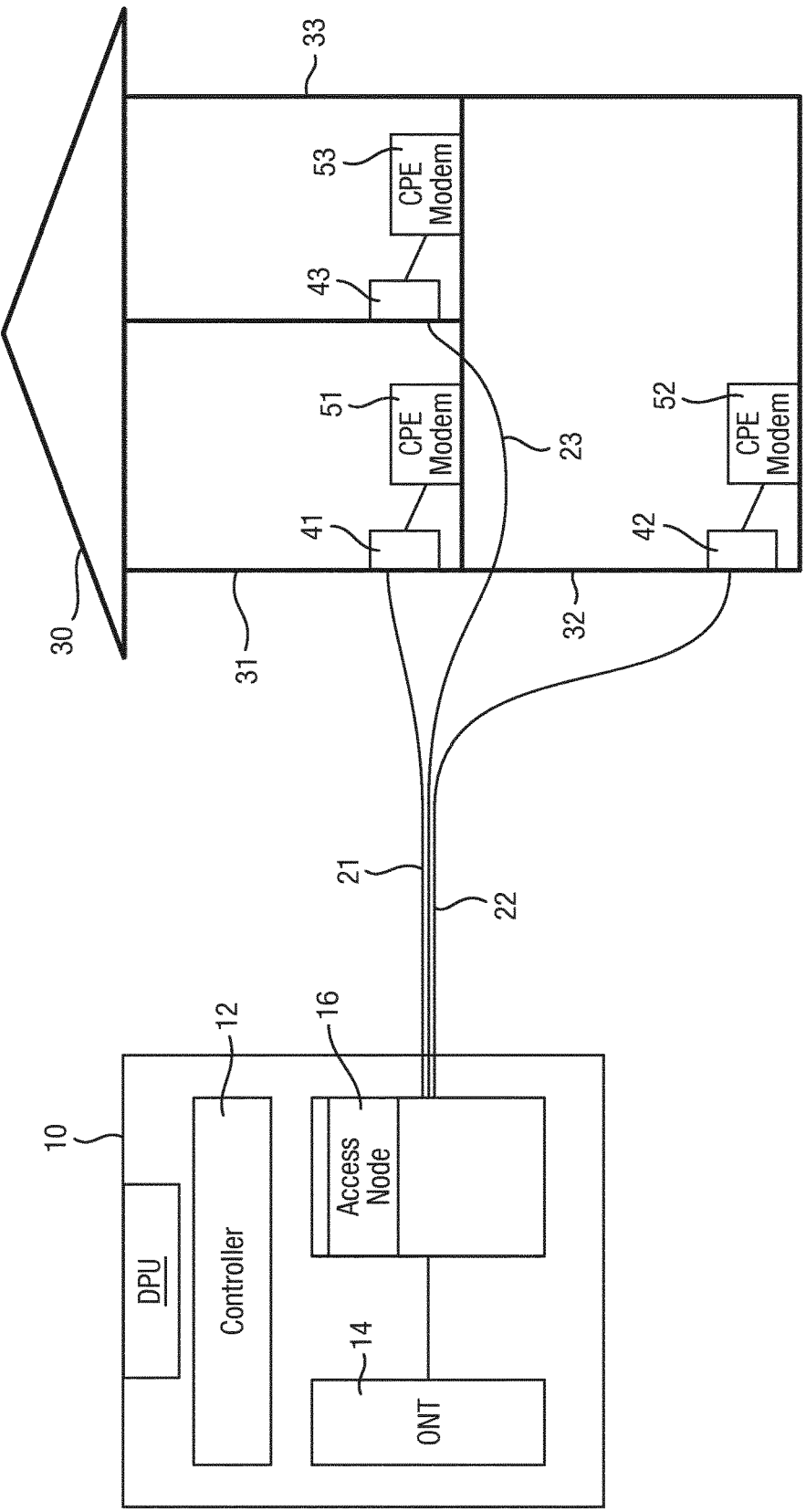
FIG. 1 is a schematic illustration of an example broadband connection deployment showing a Distribution Point Unit (DPU) and two customer premises having associated Customer Premises Equipment (CPE) modems connected to the DPU via respective Twisted Metallic Pair (TMP) connections.

FIG. 1 illustrates in overview an example broadband deployment in which embodiments of the present invention could be employed. As shown in FIG. 1, the example deployment comprises a Distribution Point Unit (DPU) 10 which is connected to three user premises 31, 32, 33 (which in this example are flats within a single house 30) via respective Twisted Metallic Pair (TMP) connections 21, 22, 23 which connect between an Access Node (AN) 16 (e.g. a Digital Subscriber Line Access Multiplexor (DSLAM)) within the DPU 10 and respective Customer Premises Equipment (CPE) modems 51, 52 via respective network termination points 41, 42 within the respective customer premises 31, 32. The DPU 10 additionally includes an Optical Network Termination (ONT) device 14 which provides a backhaul connection from the DPU 10 to a local exchange building via an optical fibre connection such as a Passive Optic-fibre Network (PON) and a controller 12 which coordinates communications between the AN 16 and the ONT 14 and which may perform some management functions such as communicating with a remote Persistent Management Agent (PMA).

As will be apparent to a person skilled in the art, the illustrated deployment involving an optical fibre backhaul connection from a distribution point and a twisted metallic pair connection from the distribution point to the "customers" premises is exactly the sort of deployment for which the G.FAST standard is intended to be applicable. In such a situation, the TMP connections may be as short as a few hundred metres or less, for example possibly a few tens of metres only and because of this it is possible to use very high frequency signals (e.g. up to a few hundred Megahertz) to communicate over the short TMP's because the attenuation of high frequency signals is insufficient to prevent them from carrying useful information because of the shortness of the lines. However, at such high frequencies crosstalk becomes a significant issue. This is clearly especially going to be the case where the cross-talking lines travel alongside each other for part of their extent (as in the situation illustrated in FIG. 1); however, cross-talk is still an issue at high frequencies (e.g. over 80 MHz) even where the lines only lie close to one another for a very small portion of their total extent (e.g. just when exiting the DPU 10). G.FAST currently proposes simply using vectoring techniques at all frequencies where there are cross-talking lines in order to mitigate against the cross-talk effects.

In addition, in this scenario, by accessing at the DPU 10 (in particular at the Access Node (AN) 16) phantom channels, it is possible to exploit signals transmitted onto phantom channels which will "crosstalk" onto the conventional differential mode channels associated with each of the end user receivers (the termination point and CPE modem combinations 41/51, 42/52, 43/53) and change the signals received (compared to a conventional case where the phantom channels are not exploited in this way). Since there are three TMP connections 21-23, there are 3 possible (first order, pure) phantom channels which could be exploited in this way, formed by using the differential voltage signal between: the average voltage of TMP 21 and that of TMP 22; the average voltage of TMP 21 and that of TMP 23; and the average of TMP 22 and that of TMP 23. However, since there is no possible set of two of these possible (first order, pure) phantom channels which does not include at least one common TMP, only one of these can be used at the same time without having non-orthogonal (and hence complexly interfering) phantom channels being used simultaneously. Thus the present embodiment includes a Phantom Channel—Multiple Optimisation Problem device (PC-MOP) which, as is explained in greater detail below, acts to choose a single one out of the three possible phantom channels to use—the selection being performed such as to try to achieve a particular set of two (or more) objectives (e.g. to try to obtain the maximum benefit for two of the three receivers).

Figure 2:
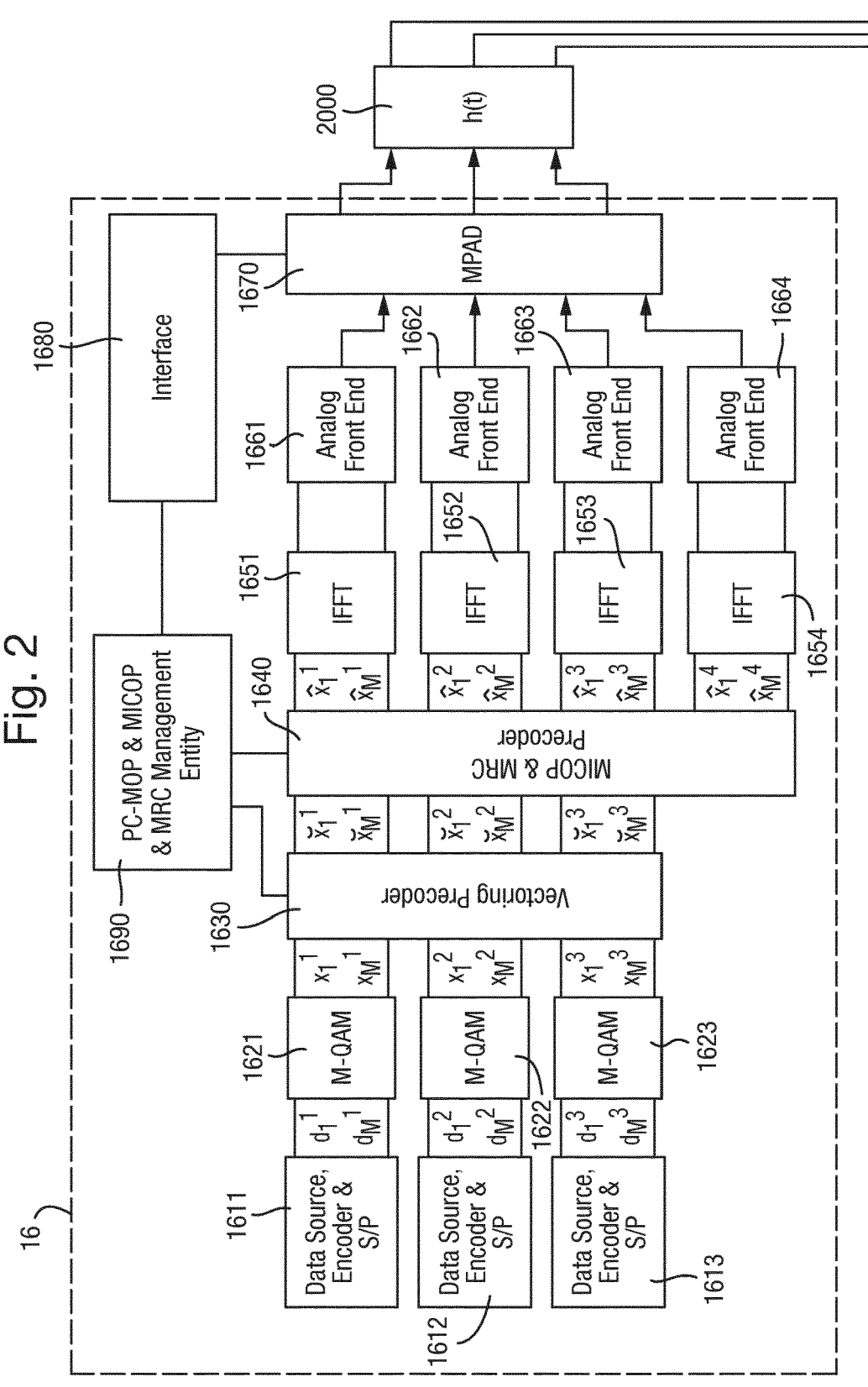
FIG. 2 is a schematic block diagram illustrating the principal components in a modem to modem connection operating in accordance with a first embodiment of the present invention.
Figure 2:
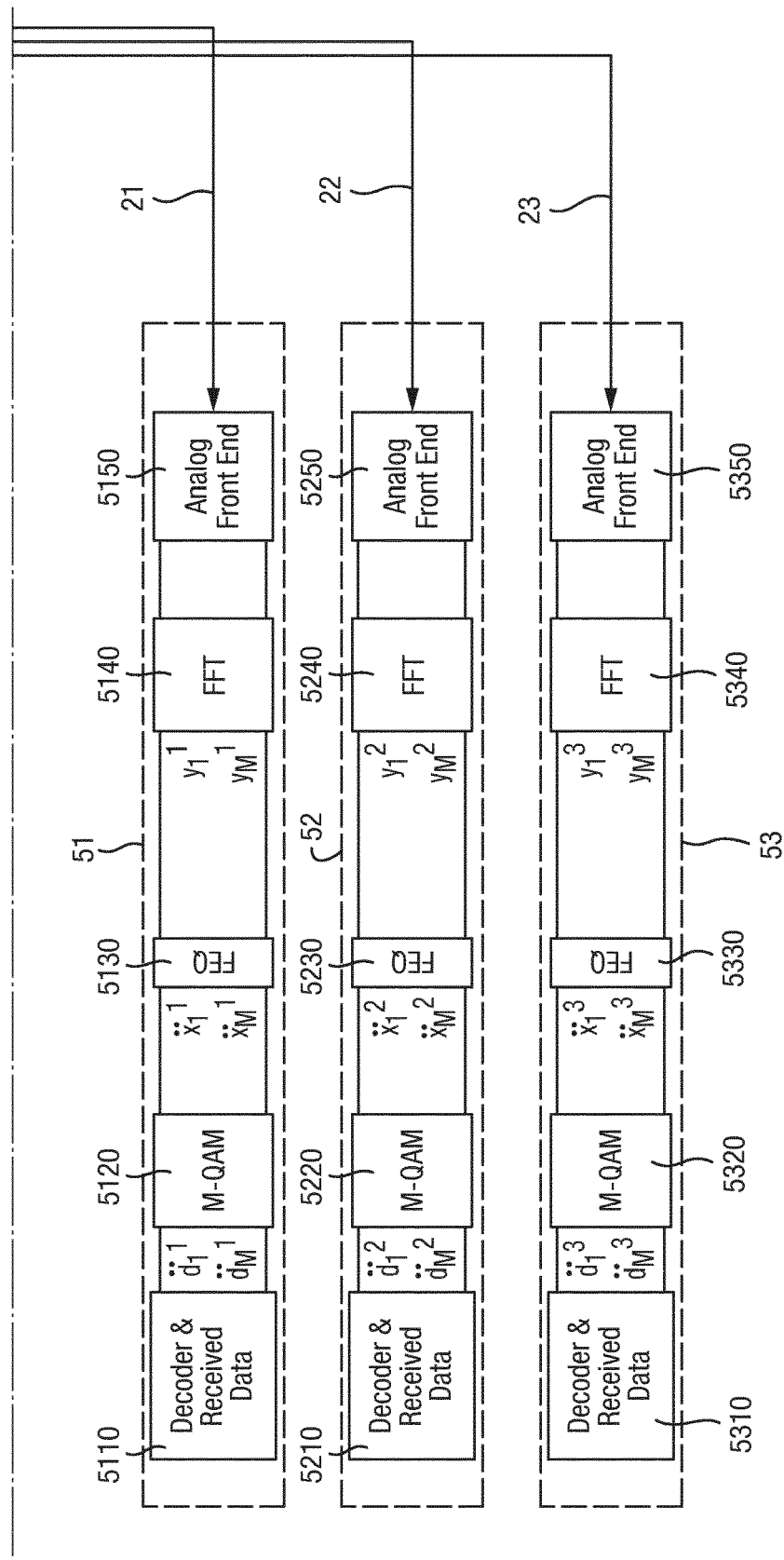
Figure 3:
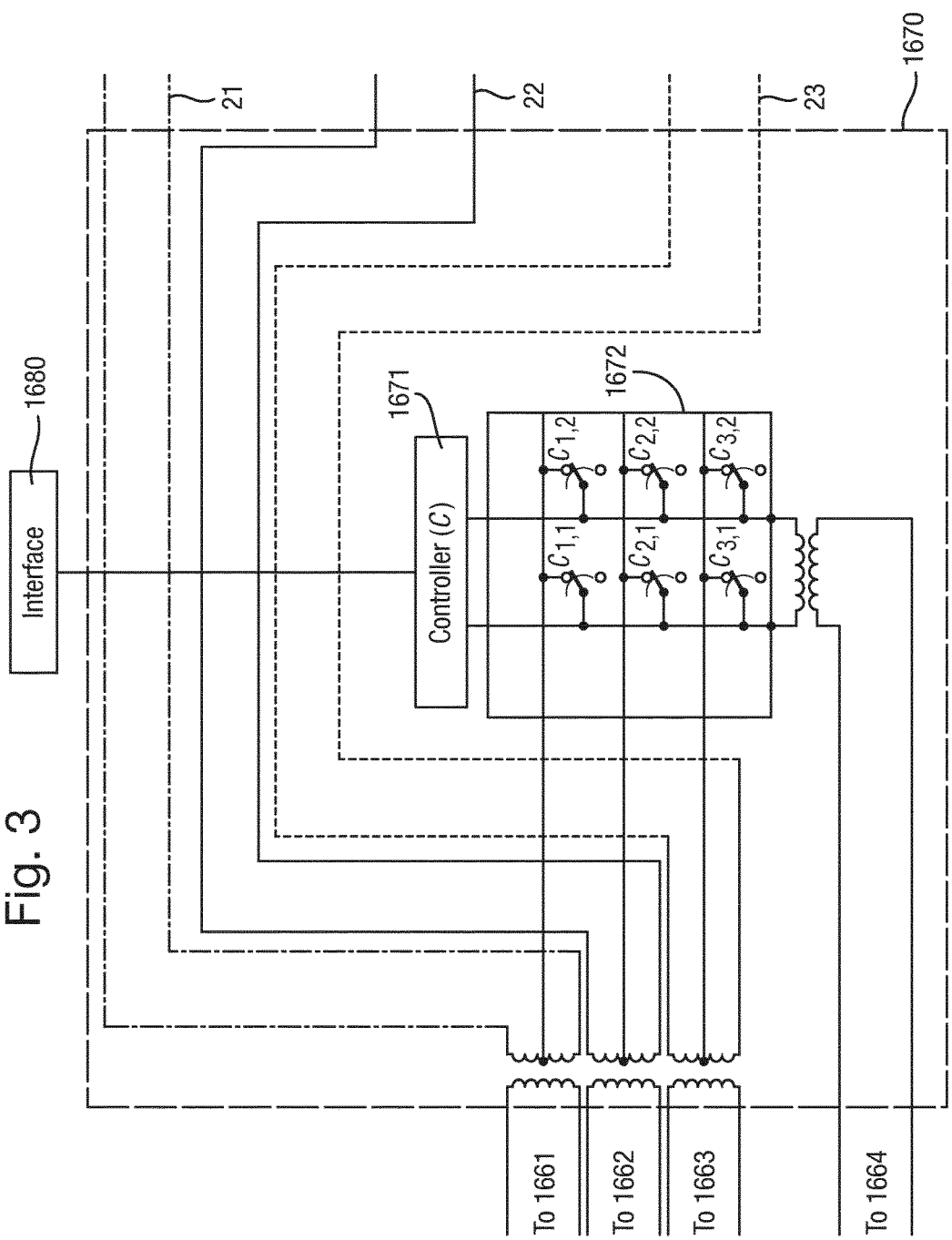
FIG. 3 is a schematic block diagram of the Multiple Phantom Access Device (MPAD) of FIG. 2, illustrating the device in greater detail.
Figure 4:
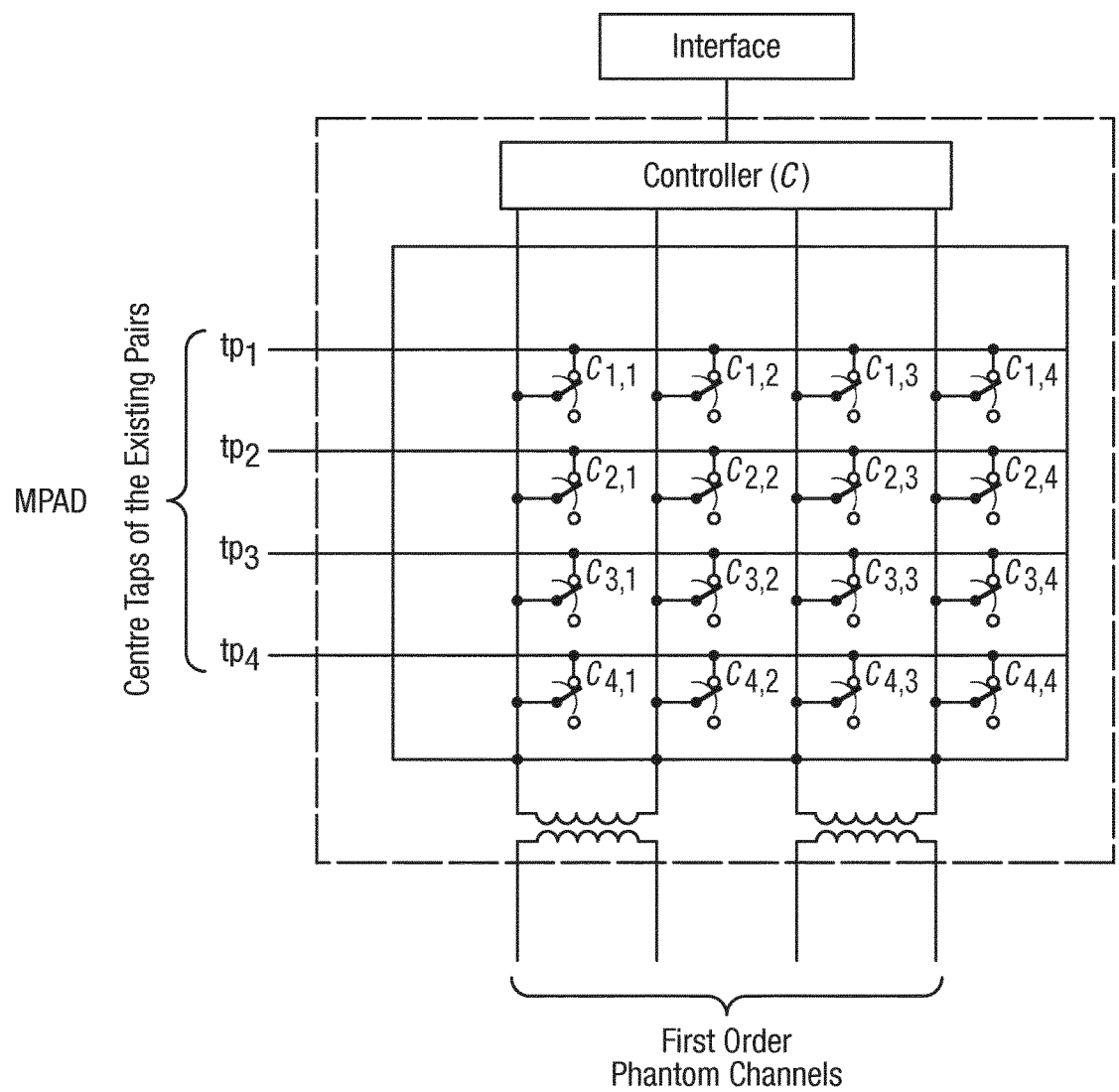
FIG. 4 is a schematic block diagram similar to FIG. 3, illustrating an alternative Multiple Phantom Access Device (MPAD) which is suitable for use with four rather than three wire pairs.
Figure 5:
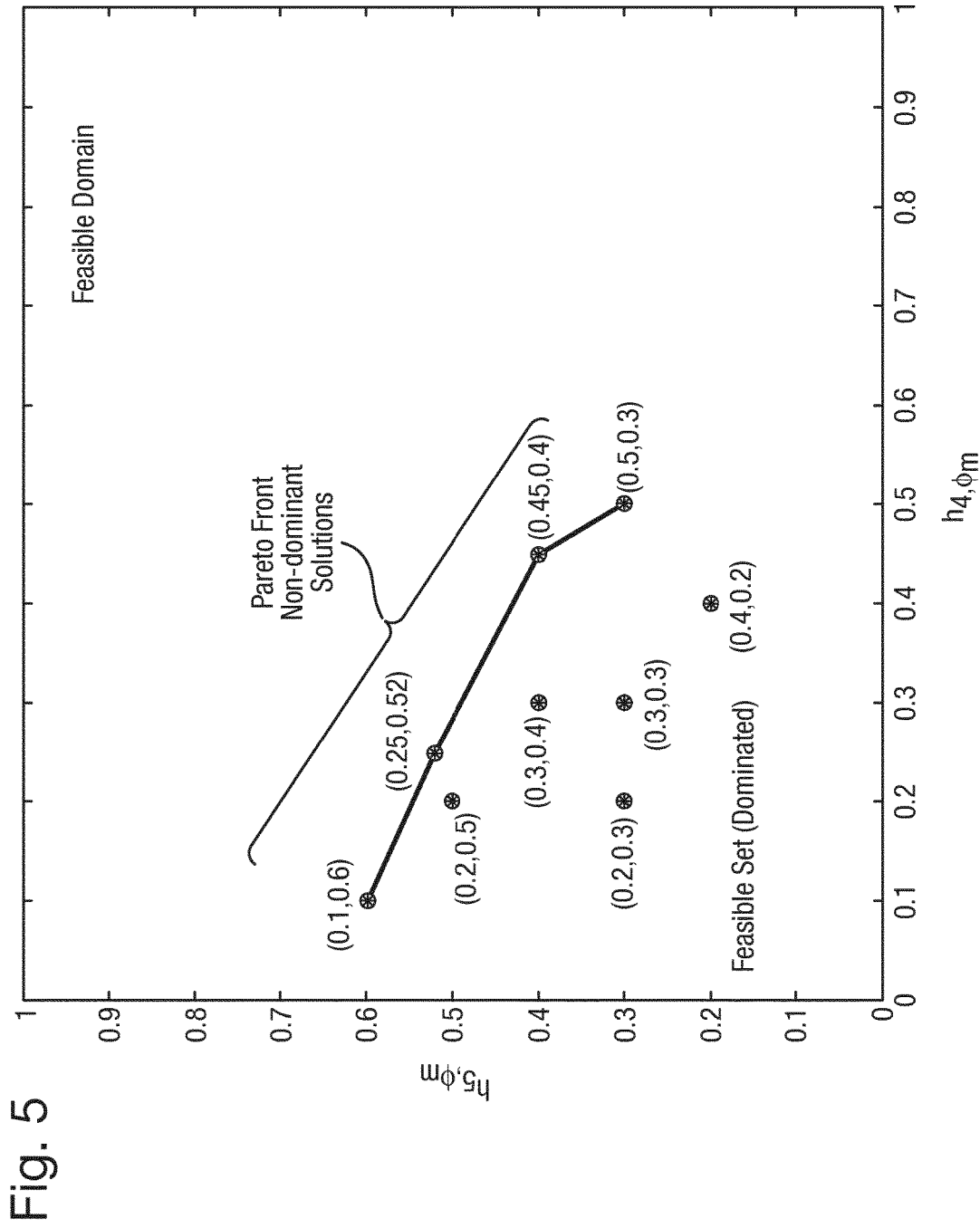
FIG. 5 is a graph illustrating an example pareto front for a simple case concerning selecting optimal phantom channels for use in assisting two different wire pairs/receivers.

Referring now to FIG. 2, there is shown a schematic illustration of the principal components within the AN 16 and CPE modems 51, 52, 53 allowing the indirect phantom channels to be utilised according to a first simple embodiment chosen to illustrate the basic principles of the approach.

As shown, the AN 16 according to the embodiment illustrated in FIG. 2 comprises first, second and third Data Source, Data Encoder and Serial to Parallel converter (DS-DESP) modules 1611, 1612 and 1613. These are essentially conventional functions within a DSL modem and will not be further described here except to point out that each one's output is a set of data values $d_1$-$d_M$ each of which can be mapped to both a set of one or more bits and to a point within a modulation signal constellation associated with a respective tone on which the data value is to be transmitted. For example if a tone $t_1$ is determined to be able to carry 3 bits of data a corresponding data value will be set to one of $2^3$=8 different values (e.g. to a decimal number between 0 and 7) each of which corresponds to a different constellation point within an associated signal constellation having 8 different constellation points. The data values for a single symbol can be thought of as forming a vector of data values (one for each data-carrying tone) and together carry the user data to be transmitted to the end user associated with a respective end user modem 51, 52, 53 together with any overhead data (e.g. Forward Error Correction data etc.).

(N.B. It is worth noting that the assessment of the number of bits which any particular tone for any particular receiver may carry (per symbol) should be done with the benefit of the usage of any assisting phantom mode channels (as discussed below) and the benefit of vectoring taken into account. Thus it should be borne in mind that the present discussion relates to "Showtime" operation of the system once all training procedures have been completed. In overview the training involves firstly determining which phantom channel (or channels in embodiments in which more than one phantom channel can be exploited at the same time—e.g. for embodiments in which more than 3 lines are connected to a common AN and are sufficiently closely cross-talk coupled to make exploitation of the phantoms worthwhile) to use and then setting parameters for its usage. Having determined how to best exploit the phantom channels, then the training continues by performing vectoring training to determine the vectoring parameters to use and then determining the number of bits which can be used with both assistance from the phantom channel(s) and from vectoring.)

The data values leaving each DSDESP module 1611, 1612, 1613 are then passed (in an appropriate order) to respective Multiple bit level Quadrature Amplitude Modulation (M-QAM) modulators 1621, 1622, 1623 which convert each input data value to a respective complex number $x_1^1$ to $x_M^1$, $x_1^2$ to $x_M^2$ and $x_1^3$ to $x_M^3$ each of which represents a complex point within a complex number constellation diagram. For example a data value $d_1^1=7$ (=111 in binary) might be mapped by the M-QAM modulator 1621 to the complex number 1-$i$ for tone 1 where tone 1 has been determined (by say modem 51) to be able to carry 3 bits of data each.

Each of these complex numbers $x_1^1$ to $x_M^1$, $x_1^2$ to $x_M^2$ and $x_1^3$ to $x_M^3$ is then entered into a vectoring precoder module 1630 (which in the present embodiment is a single common vectoring precoder module 1630) which performs a largely conventional vectoring operation in order to precode the transmissions to be sent using a combination of predetermined vectoring coefficients and information about the signals to be transmitted onto the other lines within the relevant vector group in a manner, which is well known to those skilled in the art, to compensate for the expected effects of cross-talk from the other lines in the vector group. The vectoring precoder module differs from a conventional vectoring precoder module in that it is operable to additionally precode the transmissions in such a way as to cause them to be pre-compensated for the expected crosstalk effects produced not only by the neighbouring lines operating in a direct differential mode (as per standard vectoring), but also for the effects of crosstalk coming from any signals being transmitted onto one or more phantom channels (or other channels which are not direct differential mode channels). In order to do this (as will become apparent form the detailed description below) it is necessary for the vectoring precoder module 1630 to receive information about channel estimations of the respective phantom channel(s) (or other channels which are not direct differential mode channels) and also information about any weighting values used to combine signals to be transmitted over the phantom channel(s) (or other channels which are not direct differential mode channels). The output from the vectoring precoder module 1630 is thus a set of further modified complex numbers i: $\hat{x}_1^1$ to $\hat{x}_M^1$, $\hat{x}_1^2$ to $\hat{x}_M^2$ and $\hat{x}_1^3$ to $\hat{x}_M^3$.

The ability of the vectoring precoder module 1630 to receive the weighting values and channel estimation values which it needs to perform its precoding functions is illustrated in FIG. 2 by the line between the PC-MOP & MICOP & MRC & Management entity module 1690 (which performs general management functions in addition to its specific functions described in greater detail below and for brevity may hereinafter be referred to either as the "management entity" or the "PC-MOP module") and the vectoring precoder module 1630. In the present embodiment, the PC-MOP module calculates appropriate values for the channel estimations and the weighting values required by the vectoring precoder module and the MICOP & MRC precoder module 1640. In order to do this, it needs data reported back to it from the end user modems. The processes and procedures for achieving this are largely conventional and well known to persons skilled in the art and so they are not discussed in great detail herein except to note that it relies on a backward path from the receivers 51,52,53 to the transmitter 16. This is achieved in practice, of course, in that the receivers 51,52,53 are in practice transceivers capable of receiving and transmitting signals over the TMP's 51,52,53 as is the transmitter 16—the receiver parts of the transmitter 16 and the transmitter parts of the receivers 51,52,53 have simply been omitted from the drawings to avoid unnecessary complication of the figures because these parts are entirely conventional and not directly pertinent to the present invention. Moreover, each of the receivers additionally contains a management entity responsible for performing various processing and communication functions. Any of a number of suitable techniques can be employed for obtaining data useful in generating channel estimations. For example, known training signals can be transmitted onto selected channels by the transmitter 16 during a special training procedure and the results of detecting these by the receivers 51,52,53 can be sent back to the transmitter in a conventional manner. Additionally, special synchronisation symbols can be transmitted, interspersed with symbols carrying user data, at predetermined "locations" within a "frame" comprising multiple symbols (e.g. at the beginning of each new frame) and the results of attempting to detect these synchronisation symbols can also be sent back to the transmitter to generate channel estimation values. As is known to persons skilled in the art, different synchronisation signals/symbols can be sent over different channels simultaneously and/or at different times etc. so that different channel estimations (including importantly indirect channels and indirect channels can be targeted and evaluated, etc.

As will be appreciated by those skilled in the art, the output of the vectoring precoder module 1630 is a set of modified (or predistorted) complex numbers $\check{x}_1^1$ to $\check{x}_M^1$, $\check{x}_1^2$ to $\check{x}_M^2$ and $\check{x}_1^3$ to $\check{x}_M^3$ as mentioned above. These complex numbers are then passed to a Mixed-Integer Convex Optimisation Problem and Maximal Ratio Combiner (MICOP and MRC) precoder module 1640 (hereinafter referred to as the MICOP and MRC precoder module 1640) which, in the present embodiment, uses weighting values together with channel estimation values provided to it by the PC-MOP module 1690 to calculate, from the modified complex numbers received from the vectoring pre-coder module 1640 (and the weighting values and channel estimation values from the PC-MOP module 1690), further modified (or further pre-distorted) values for the complex numbers to be passed to the IFFTs 1651-1652. Note that in addition to further modifying the received numbers $\check{x}_1^1$ to $\check{x}_M^1$, $\check{x}_1^2$ to $\check{x}_M{}^2$ and $\check{x}_1{}^3$ to $\check{x}_M{}^3$ to generate corresponding further modified complex numbers $\ddot{x}_1{}^1$ to $\ddot{x}_M{}^1$, $\ddot{x}_1{}^2$ to $\ddot{x}_M{}^2$ and $\ddot{x}_1{}^3$ to $\ddot{x}_M{}^3$ which are to form (ultimately) the signals to be used in driving the respective TMPs 21, 22, 23 in direct differential mode, the MICOP and MRC precoder module 1640 additionally generates a new set of complex numbers $\ddot{x}_1{}^4$ to $\ddot{x}_M{}^4$ which are to form (ultimately) the signals to be used to drive a (single ended) phantom mode channel to be accessed via the MPAD module described below. The precise way in which this is done is described below with reference to appropriate equations. Once these values have been calculated by the MICOP and MRC precoder 1640 they are passed to the respective IFFT modules 1651-1654 (superscript 1 values going to IFFT 1651, superscript 2 values going to IFFT 1652, etc.) and the next two steps of the processing are conventional and not relevant to the present invention. Thus each set of generated values (e.g. $\ddot{x}_1{}^1$ to $\ddot{x}_M{}^1$ is formed by the respective IFFT module into a quadrature time domain signal in the normal manner in Orthogonal Frequency Division Multiplexing (OFDM)/DMT systems). Then the time domain signals are processed by a suitable Analogue Front End (AFE) module 1661 to 1664 again in any suitable such manner including any normal conventional manner. After processing by the AFE module 1650, the resulting analogue signals are passed to the MPAD module 1670 (note MPAD stands for Multiple Phantom Access device).

The MPAD module is described in greater detail below, but in overview it provides switchable access to centre taps of any of the TMPs such that any of the possible phantom channels associated with the connected lines can be driven by the incoming signal arriving from AFE 1664 as well as directly passing on the signals from AFE's 1661-1663 directly to TMPs 21-23 for driving in the normal direct differential mode.

During transmission over the TMP connections 21, 22, 23 the signals will be modified in the normal way according to the channel response of the channel and due to external noise impinging onto the connections. In particular there will be cross-talking (and most particularly far-end cross-talking) between the three direct channels (the direct channels being one from the transmitter 16 to the modems 41-43 via the TMPs 21-23 and the phantom channel. However, the effect of the precoding is to largely precompensate for the effects of the cross talk. Additionally, the targeted receivers additionally benefit from increased SNR of the received signal destined for them arriving via cross talk from the phantom channel.

After passing over the TMP connections 21, 22, 23 the signals are received by the modems 41-43 at a respective Analogue Front End (AFE) module 5150, 5250, 5350 which performs the usual analogue front end processing. The thus processed signals are then each passed to a respective Fast Fourier Transform (FFT) module 5140, 5240, 5340 which performs the usual conversion of the received signal from the time domain to the frequency domain. The signals leaving the FFT modules 5140, 5240, 5340, $y_1{}^1$ to $y_M{}^1$, $y_1{}^2$ to $y_M{}^2$ and $y_1{}^3$ to $y_M{}^3$ are then each passed, in the present embodiment, to a respective Frequency domain EQualiser (FEQ) module 5130, 5230, 5330. The operation of such frequency domain equaliser modules is well-known in the art and will not therefore be further described herein. It should be noted however, that any type of equalisation could be performed here, such as using a simple time-domain linear equalizer, a decision feedback equaliser, etc. For further information on equalisation in OFDM systems, the reader is referred to: "*Zero-Forcing Frequency-Domain Equalization for Generalized DMT Transceivers with Insufficient Guard Interval*," by Tanja Karp, Steffen Trautmann, Norbert J. Fliege, EURASIP Journal on Applied Signal Processing 2004:10, 1446-1459.

Once the received signal has passed through the AFE, FFT and FEQ modules, the resulting signals, $\ddot{x}_1{}^1$ to $\ddot{x}_M{}^1$, $\ddot{x}_1{}^2$ to $\ddot{x}_M{}^2$ and $\ddot{x}_1{}^3$ to $\ddot{x}_M{}^3$ should be similar to the complex numbers $x_1{}^1$ to $x_M{}^1$, $x_1{}^2$ to $x_M{}^2$ and $x_1{}^3$ to $x_M{}^3$ originally output by the M-QAM modulators 1621-1623 except that there will be some degree of error resulting from imperfect equalisation of the channel and the effect of external noise impinging onto the lines during transmission of the signals between the AN and the modems 41-43. This error will in general differ from one receiving modem to the next. This can be expressed mathematically as $\ddot{x}_m{}^1 = x_m{}^1 + e_m{}^1$ etc. Provided the error however is sufficiently small the signal should be recoverable in the normal way after processing by the M-QAM demodulator modules 5120-5320 where a corresponding constellation point is selected for each value $\ddot{x}_m{}^i$ in dependence on its value (e.g. by selecting the constellation point closest to the point represented by the value $\ddot{x}_m{}^i$ unless trellis coding is being used, etc.). The resulting data values $\dot{d}_1{}^1$ to $\dot{d}_M{}^1$, $\dot{d}_1{}^2$ to $\dot{d}_M{}^2$ and $\dot{d}_1{}^3$ to $\dot{d}_M{}^3$ should mostly (apart from some small number of incorrectly detected values resulting from errors) correspond to the data values, $\ddot{d}_1{}^1$ to $\ddot{d}_M{}^1$, $\ddot{d}_1{}^2$ to $\ddot{d}_M{}^2$ and $\ddot{d}_1{}^3$ to $\ddot{d}_M{}^3$ originally entered to the corresponding M QAM modules 1621, 1622, 1623 respectively within the AN/transmitter 16. These values are then entered into a respective decoder (and received data processing) module 5110, 5210 and 5230 which reassembles the detected data and performs any necessary forward error correction etc. and then presents the recovered user data to whichever service it is addressed to in the normal manner, thus completing the successful transmission of this data.

As mentioned above, following now from the above overview of FIG. 2, a more detailed explanation is provided of the non-conventional elements within the embodiment illustrated in FIG. 2 and described briefly above. Thus, the MPAD 1670 is a component which provides access to different combinations of phantom channels. MPAD 1670 tries all the possible combinations without repetition, e.g. phantom of pair 1 and pair 2 is equivalent to the phantom of pair 2 and pair 1 and so will not be repeated). Herein, MPAD (1670) selects a specific phantom and it allows the transmitter 16 and each respective receiver 51, 52, 53 to train up with each other and obtain the phantom channel as well as the direct differential mode pairs' channel coefficients at any given specific time slot. At this stage the receivers 51, 52, 53 report either the overall combined channel or the phantoms only to the PC-MOP module 1690 depending on what signals are transmitted by the transmitter 16 which is done under the control of the PC-MOP module so that it knows what data is being reported back to it by the receivers. At the same time the Interface 1680 confirms the identification of the selected and currently operational phantom channel to PC-MOP module 1690 (which is also selected by the interface 1680 under instruction from the PC-MOP module) so that all channel gains and their identifications are capable of being ascertained by PC-MOP 1690 for subsequently passing to the vectoring precoder module 1630 and the MICOP & MRC precoder module 1640 for use in performing their precoding functions. The operation continues until all the phantom channels' combinations are tested. Once the phantom tree is completed, PC-MOP 1690 decides the optimal phantom channels to be exploited to benefit specific pairs, all the pairs or to maximise the rate equilibrium of the users.

The decision is then forwarded to the MPAD module 1670 via the Interface 1680 to execute the decision and enable the access to the selected optimal phantom channel (or channels in alternative embodiments where the MPAD connects to more than 3 TMPs).

Once the optimum phantom channel is "constructed" and ready to be accessed, MICOPMRC module 1640 then decides the optimal strategy to "steer" the constructed phantoms. This is done by selecting appropriate weighting values as described in greater detail below. The steering objective can be modified to maximise a specific pair or the rate equilibrium or any other desired objective.

There now follows a mathematical explanation of the functioning of the various elements. In some cases the equations deal only with two direct differential mode signals and one phantom mode signal; however, it will be apparent to a person skilled in the art how to expand this to cover multiple different direct differential signals and multiple phantom signals based on the following example expositions. Thus, considering a system with K twisted pairs, each pair denoted by $tp_i$ where i, $i \in K$ is the pair's index, there are $$M = \left\lfloor \frac{K}{d} \right\rfloor$$

first order orthogonal phantoms, where d is the required number of pairs to construct a single phantom channel. Similar rule applies for second order phantoms and so on until the orthogonal phantom tree is fully obtained. The total number of the first order orthogonal phantom candidates can be calculated by $$\binom{K}{d} = \frac{K!}{d!(K-d)!}$$

and we will consider this as the feasible domain for the PC-MOP problem, denoted by $\Phi$. The standard conventional channel is given as:

$$H = \begin{pmatrix} h_{1,1} & h_{1,2} & \cdots & h_{1,K} \\ h_{2,1} & h_{2,2} & \cdots & h_{2,K} \\ \vdots & \vdots & \ddots & \vdots \\ h_{K,1} & h_{K,2} & \cdots & h_{K,K} \end{pmatrix}$$

where $h_{i,j}$ indicates the channel transfer function for the transmission by the transmitter onto the $j^{th}$ TMP (or phantom channel when extended as described immediately below) to the $i^{th}$ receiver as received at the $i^{th}$ receiver over the $i^{th}$ TMP or tp (=twisted pair).

A phantom channel ($\phi_m$, $\forall m \in M$) is derived from a pair of tp, i.e. $\{tp_i, tp_j\}_{i \neq j}$ $\forall i$ & $j \in K$ when d is 2. Hence the extended channel becomes:

$$[H | H_\Phi] = H_T = \begin{pmatrix} h_{1,1} & h_{1,2} & \cdots & h_{1,K} & h_{1,\phi_1} & \cdots & h_{1,\phi_M} \\ h_{2,1} & h_{2,2} & \cdots & h_{2,K} & h_{2,\phi_1} & \cdots & h_{2,\phi_M} \\ \vdots & \vdots & \ddots & \vdots & \vdots & \ddots & \vdots \\ h_{K,1} & h_{K,2} & \cdots & h_{K,K} & h_{K,\phi_1} & \cdots & h_{K,\phi_M} \\ h_{\phi_1,1} & h_{\phi_1,2} & \cdots & h_{\phi_1,K} & h_{\phi_1,\phi_1} & \cdots & h_{\phi_1,\phi_M} \\ \vdots & \vdots & \ddots & \vdots & \vdots & \ddots & \vdots \\ h_{\phi_M,1} & h_{\phi_M,2} & \cdots & h_{\phi_M,K} & h_{\phi_M,\phi_1} & \cdots & h_{\phi_M,\phi_M} \end{pmatrix}$$

where $H_\Phi$ is the phantom channel, H is the unextended channel (excluding phantom channels) and $H_T$ is the mixed mode channel. Herein, the PC-MOP can be formulated as follows:

$$\max H_\Phi, \qquad (1)$$

subject to:

$$\phi_m \in \Phi \qquad (2)$$

To illustrate the selection strategy of Pareto, we provide the following example: Assume a 5 pair cable in which pairs 5 and 4 are performing poorly in comparison to pairs 1, 2 and 3. Therefore, the phantoms may be derived and steered to maximise the performance of pairs 4 and 5. Maximum number of the first order orthogonal phantoms is $$\left\lfloor \frac{5}{2} \right\rfloor = 2$$

and the maximum number of combinations is $$\binom{5}{2} = \frac{5 \times 4 \times 3 \times 2 \times 1}{2 \times 1(3 \times 2 \times 1)} = 10.$$

Table 1 shows all the orthogonal phantom candidates and their mode-conversion crosstalk coefficient with the targeted pairs. To obtain Pareto front, we must determine the non-dominant solution, i.e. Pareto front. To examine the dominance of a set, it must contain at least one element greater than an element in another set if the objective function is set to maximisation. In this particular example, {1,2} dominates {1,3}, {1,4}, {2,5} and {3,4}. Similarly, candidates {1,5}, {2,3} and {2,4} dominant {1,3}, {1,4}, {2,5} and {3,4}. Hence {1,2}, {1, 5}, {2,3} and {2, 4} are the non-dominant solution and known as the Pareto front, see the example Figure below.

In a similar way, the objective function can include more pairs to benefit from the phantoms, also the phantom directivity can be altered to optimise the direct paths of the

TABLE 1

First order phantom mode candidates $\{tp_i, tp_j\}_{i \neq j}$

| $h_{k,\phi_m}$ | {1, 2} | {1, 3} | {1, 4} | {1, 5} | {2, 3} | {2, 4} | {2, 5} | {3, 4} | {3, 5} | {4, 5} |
|---|---|---|---|---|---|---|---|---|---|---|
| $h_{5,\phi_m}$ | 0.5 | 0.3 | 0.4 | 0.45 | 0.25 | 0.1 | 0.3 | 0.2 | 0.3 | 0.2 |
| $h_{4,\phi_m}$ | 0.3 | 0.3 | 0.2 | 0.4 | 0.52 | 0.6 | 0.3 | 0.3 | 0.4 | 0.5, | phantom mode if they are accessible at the receiving end, i.e. direct phantom channels. This remains the choice of the network operator. Since predicting the phantom coupling strength from first principles is an arduous task, in the present embodiment, PC-MOP 1690 proceeds by simply initialising all possible phantom channels randomly in a non-repetitive pattern. Alternatively, however, one could also model the phantoms and predict their performance in advance and select the optimal combination without the random training in alternative embodiments.

Once the phantoms are defined, it is advantageous to try to determine the optimal strategy to steer and split the indirect channels to maximise the overall binder capacity whilst fairness constraints between the users are kept satisfied. To achieve this, the indirect (phantom/crosstalk) channel utilisation problem is formulated as a Mixed-Integer Convex OPtimisation (MICOP) model in order to enable the PC-MOP 1690 to then derive a solution.

In order to simplify the problem, to illustrate the operation of the PC-MOP 1690, consider a single phantom to be shared among K users to transmit N tones for a period of time T. Power level per tone is denoted by $P_{k,t,n}$ and the channel condition is $\gamma_{k,t,n}$ which is the ratio of power coupling coefficient to the noise level $$\left(\frac{|h_{k,\phi_m}|^2}{n_{k,\phi_m}}\right)_{t,n}.$$

The tone allocation factor is $\rho_{k,t,n}$ and finally the optimal capacity of the $m^{th}$ phantom is $C_{\phi_m}$, $$\max C_{\phi_m} = \sum_{k,t,n} \rho_{k,t,n} \log_2(1 + p_{k,t,n}\gamma_{k,t,n}), \quad (3)$$

subject to:

$$\sum_{k,n} p_{k,t,n} \leq P_{\phi_m}, \forall t \in T \quad (4a)$$

$$\sum_{t,n} \rho_{k,t,n} \log_2(1 + p_{k,t,n}\gamma_{k,t,n}) \leq R_k, \forall k \in K \quad (4b)$$

$$\sum_{k,t} \rho_{k,t,n} \leq T, \rho \in \{0,1\}, \forall n \in N, \quad (4c)$$

Equation (3) is the objective function in which its limit is subject to the maximum transmitting power in 4a and the tone sharing criteria in 4c.

The optimisation problem in its current form is non-linear with no known analytical solution. However, a simple modification has been applied to 3.

$$\max C_{\phi_m} = \sum_{k,t,n} \rho_{k,t,n} \log_2\left(1 + \frac{s_{k,t,n}\gamma_{k,t,n}}{\rho_{k,t,n}}\right), \quad (5)$$

subject to:

$$\sum_{k,n} s_{k,t,n} \leq P_{\phi_m}, \forall t \in T \quad (6a)$$

$$\sum_{t,n} \rho_{k,t,n} \log_2\left(1 + \frac{s_{k,t,n}\gamma_{k,t,n}}{\rho_{k,t,n}}\right) \leq R_k, \forall k \in K \quad (6b)$$

$$\sum_k \rho_{k,n} \leq 1, \forall n \in M, \forall t \in T \quad (6c)$$

The modified problem in 5 is concave and hence it is solvable as a convex problem. This problem as it stands provide the optimal TDMA and FDMA access to the phantoms. The analytical solution proceeds with the Lagrangian as follows:

$$\mathcal{L} = \sum_{k,t,n} \rho_{k,t,n} \log_2\left(1 + \frac{s_{k,t,n}\gamma_{k,t,n}}{\rho_{k,t,n}}\right) - \sum_t \Omega_t\left(\sum_{k,n} s_{k,t,n} - P_{\phi_m}\right) - \quad (7)$$

$$\sum_{t,n} \mu_{t,n}\left(\sum_k \rho_{k,n} - 1\right) - \sum_k \left[\sum_{t,n} \rho_{k,t,n} \log_2\left(1 + \frac{s_{k,t,n}\gamma_{k,t,n}}{\rho_{k,t,n}}\right) - R_k\right],$$

To solve 7 and prove its optimality, Karush Kuhn Tucker (KKT) conditions must be satisfied. The conditions are:
1. Feasibility of the primal constraints as well as the multipliers, i.e. ($\Omega$ & $\mu$).
2. The gradient of 7 must become zero with respect to 6a and 4c.

Starting by differentiating 7 with respect to $s_{k,n}$, i.e.

$$\frac{\partial \mathcal{L}}{\partial s_{k,n}} = 0,$$

then rearrange to obtain the optimal power formula:

$$p_{k,t,n} = \lambda_t(1 - \beta_k) - \frac{1}{\gamma_{k,t,n}}, \quad (8)$$

where $$\lambda_t = \frac{1}{\ln 2\Omega_t}.$$

To guarantee feasible 8 and 4a, $$\frac{1}{\gamma_{k,t,n}} \leq \lambda_t \leq \frac{P_{\phi_m} + \sum_{k,n} \frac{1}{\gamma_{k,t,n}}}{\sum_{k,n}(1 - \beta_k)}.$$

The sharing factor can be used simply to guarantee that a single tone can only be assigned to a single user, e.g. tone 1 assigned to user 1 is represented by $\rho_{1,1}=1$ and elsewhere $\rho_{k\neq 1,1}=0$. Hence constraint 4c is relaxed to:

$$\rho_{k,n} = \begin{cases} 1 & \text{if the } n^{th} \text{ tone is assigned to the } k^{th} \text{ user,} \\ 0 & \text{elsewhere} \end{cases}$$

In a similar fashion to 8, we differentiate 7 with respect $\rho_{k,n}$, rearrange and substitute 8 to obtain the following:

$$\mu_{t,n} = \log_2[\lambda_t(1-\beta_k)\gamma_{k,t,n}] - \frac{1}{\ln 2}\left[1 - \frac{1}{\lambda_t(1-\beta_k)\gamma_{k,t,n}}\right], \quad (9)$$

$$\forall n \in N$$

The user which maximises 9 for tone n represents the optimal user. Hence k is obtained by:

$$\hat{k} = \arg\max \mu_{t,n}, \forall t \in T, \forall n \in N \quad (10)$$

and therefore, by assessing which k (i.e. which end CPE receiver) to select for each tone, n, a weighting value, of (in this embodiment) zero or one, is determined for each line, at each tone, in dependence upon the measured extent of the couplings between a phantom mode channel, $\varphi_m$ and each differential mode channel k as determined by a receiver receiving signals in the differential mode (recall that $$\gamma_{k,t,n} = \left(\frac{|h_{k,\phi_m}|^2}{n_{k,\phi_m}}\right)_{t,n}).$$

Similarly to section 1, the method can be applied to the differential lines except that the k domain is limited to each line itself. Hence, the binder capacity in total, becomes:

$$C_{binder} = \sum_{ph} C_{\phi m} + \sum_{dif} C_{dif}, \quad (11)$$

once the phantom sharing and power allocation policies are obtained. The power allocation per line needs to be re-configured to ensure that the phantom gain results in (or at least does not exceed) the capacity gain. The optimisation problem is similar to 5 excluding 4c. Line's channel gain in the presence of phantom gain thus becomes:

$$\gamma_{\hat{k},t,n} = \left(\frac{|h_{\hat{k},\hat{k}}|^2}{n_{\hat{k},\hat{k}}} + \frac{\sum_m \rho_{\hat{k},t,n}|h_{\hat{k},\phi_m}|^2 P_{\phi_m,t,n}}{n_{\hat{k},\phi_m}}\right) \quad (12)$$

$$\max C_{\hat{k},t} = \sum_n \log_2(1 + P_{\hat{k},t,n}\gamma_{\hat{k},t,n}), \forall t \in T \quad (13)$$

subject to:

$$\sum_n p_{\hat{k},t,n} \leq P_k, \forall \hat{k} \in K, \forall t \in T, \quad (14a)$$

$$\mathcal{L} = \sum_n \log_2(1 + p_{\hat{k},t,n}\gamma_{\hat{k},t,n}) - \Omega_t\left(\sum_n p_{\hat{k},t,n} - P_k\right) \quad (15)$$

$$p_{\hat{k},t,n} = \lambda_t - \frac{1}{\gamma_{\hat{k},t,n}}, \quad (16)$$

if $n_{\hat{k},\hat{k}} = n_{\hat{k},\phi_m}$, $p_{\hat{k},t,n}$ becomes:

$$p_{\hat{k},t,n} = \lambda_t - \frac{n_{\hat{k},\hat{k}}}{|h_{\hat{k},\hat{k}}|^2 + \sum_m \rho_{\hat{k},t,n}|h_{\hat{k},\phi_m}|^2 p_{\phi_m,t,n}} \quad (17)$$

Note: Tone/subcarrier spacing is excluded from the optimisation problems because it is a constant and hence the units of the current capacity are bandwidth-normalised (known as bandwidth or spectrum efficiency) in $$\frac{bps}{Hz}.$$

An alternative formulation to the above described embodiment allows the exploitation of indirect (phantom/crosstalk) channels over the same spectrum and simultaneously for all or plural existing line users at any one or more tones, n, subject to a power constraint for the entire spectrum. To illustrate how this is achieved, the problem is decomposed; firstly, the power allocation per tone/carrier is determined and then the distribution of tone power between the active users is optimized. To enable this, the problem becomes:

$$\max \sum_n \log_2\left(1 + P_n \sum_k \gamma_{k,n}\right) \quad (18)$$

subject to:

$$\sum_n p_n \leq P_T, \quad (19a)$$

Applying the Lagrangian:

$$\mathcal{L} = \sum_n \log_2\left(1 + p_n \sum_k \gamma_{k,n}\right) - \lambda\left(\sum_n p_n - P_T\right) \quad (20)$$

Take $$\frac{\partial \mathcal{L}}{\partial p_n}$$

and then rearrange to obtain:

$$p_n = \lambda^{-1} - \frac{1}{\sum_k \gamma_{k,n}}, \quad (21)$$

Equation (21) is substituted into (19a) to calculate the multiplier, $\lambda$, and then again into (21) to calculate the optimal spatial frequency power level.

Now the distribution of $p_n$ between K users is optimised.

$$\max \sum_n log_2\left(1 + p_{k,n}\sum_k \gamma_{k,n}\right) \quad (22)$$

subject to:

$$\sum_k p_{k,n} \leq p_n, \quad (23a)$$

Applying the Lagrangian:

$$\mathcal{L} = \sum_k log_2(1 + p_{k,n}\gamma_{k,n}) - \lambda_n\left(\sum_k p_{k,n} - p_n\right) \quad (24)$$

Similarly to previous steps, the optimal power equation is obtained:

$$p_{k,n} = \lambda_n^{-1} - \frac{1}{\gamma_{k,n}}, \quad (25)$$

EXAMPLE-01

Assume two users to share a $p_n$. The optimisation problem can be simplified to:

$$\max[(1+p_{1,n}\gamma_{1,n})(1+p_{2,n}\gamma_{2,n})] \quad (26)$$

subject to:

$$p_{1,n}+p_{2,n}=p_n, \quad (27)$$

The problem in (26) is easily solvable, two equations and two unknowns. One can prove the optimal power allocation from both problem (22) and (26) is:

$$p_{1,n} = \frac{p_n\left(\prod_{k=1}^{2}\gamma_{k,n}\right) + \gamma_{1,n} - \gamma_{2,n}}{2\prod_{k=1}^{2}\gamma_{k,n}} \quad (28)$$

Finally $p_{2,n}$ is equal to $p_n - p_{1,n}$.

EXAMPLE-02

In terms of signal precoding and real signal injection for a given MPAD (1670) settings, consider the following:
The data, $[d_1 \; d_2]$, are first modulated, e.g. using M-QAM, at a given subcarrier (n) to produce the original data symbols:

$$X = \begin{pmatrix} X_1 \\ X_2 \end{pmatrix}$$

The precoded data symbols (using MICOP-MRC) are calculated as follows:

$$\hat{X} = \begin{pmatrix} \frac{h_{1,1}^*}{|h_{1,1}|} & 0 \\ 0 & \frac{h_{2,2}^*}{|h_{2,2}|} \\ \frac{\rho_1 h_{1,3}^*}{|h_{1,3}|} & \frac{\rho_2 h_{2,3}^*}{|h_{2,3}|} \end{pmatrix}\begin{pmatrix} X_1 \\ X_2 \end{pmatrix} = \begin{pmatrix} \frac{x_1 h_{1,1}^*}{|h_{1,1}|} \\ \frac{x_2 h_{2,2}^*}{|h_{2,2}|} \\ \frac{x_1\rho_1 h_{1,3}^*}{|h_{1,3}|} + \frac{x_2\rho_2 h_{2,3}^*}{|h_{2,3}|} \end{pmatrix}$$

where $$\rho_1 + \rho_2 = 1.$$

Note that $p_n = \left|\frac{x_1\rho_1 h_{1,3}^*}{|h_{1,3}|}\right|^2 + \left|\frac{x_2\rho_2 h_{2,3}^*}{|h_{2,3}|}\right|^2$ where $$\left|\frac{x_1\rho_1 h_{1,3}^*}{|h_{1,3}|}\right|^2 = p_{1,n}$$

and $$\left|\frac{x_2\rho_2 h_{2,3}^*}{|h_{2,3}|}\right|^2 = p_{2,n}.$$

Hence, $$\rho_1 = \frac{|h_{1,3}|\sqrt[2]{p_{1,n}}}{|x_1 h_{1,3}^*|}$$

and $$\rho_2 = \frac{|h_{2,3}|\sqrt[2]{p_{2,n}}}{|x_2 h_{2,3}^*|},$$

see Example-01. Index n is dropped from the matrices for clarity.

Non-vectored received signals:

$$\tilde{Y} = \begin{pmatrix} h_{1,1} & h_{1,2} & h_{1,3} \\ h_{2,1} & h_{2,2} & h_{2,3} \end{pmatrix}\begin{pmatrix} \frac{x_1 h_{1,1}^*}{|h_{1,1}|} \\ \frac{x_2 h_{2,2}^*}{|h_{2,2}|} \\ \frac{x_1\rho_1 h_{1,3}^*}{|h_{1,3}|} + \frac{x_2\rho_2 h_{2,3}^*}{|h_{2,3}|} \end{pmatrix}$$

To remove the unwanted coupling after combining, the new channel coefficients must be calculated using the MRC coefficients since that the 1630 sees include the MICOP-MRC part of the channel:

$$\begin{pmatrix} h_{1,1} & h_{1,2} & h_{1,3} \\ h_{2,1} & h_{2,2} & h_{2,3} \end{pmatrix}\begin{pmatrix} \frac{h_{1,1}^*}{|h_{1,1}|} & 0 \\ 0 & \frac{h_{2,2}^*}{|h_{2,2}|} \\ \frac{\rho_1 h_{1,3}^*}{|h_{1,3}|} & \frac{\rho_2 h_{2,3}^*}{|h_{2,3}|} \end{pmatrix} =$$

$$\begin{pmatrix} |h_{1,1}| + \rho_1|h_{1,3}| & \frac{h_{1,2}h_{2,2}^*}{|h_{2,2}|} + \frac{\rho_2 h_{1,3}h_{2,3}^*}{|h_{2,3}|} \\ \frac{h_{2,1}h_{1,1}^*}{|h_{1,1}|} + \frac{\rho_1 h_{2,3}h_{1,3}^*}{|h_{1,3}|} & |h_{2,2}| + \rho_2|h_{2,3}| \end{pmatrix}$$

The vectoring precoder in 1630 becomes:

$$\begin{pmatrix} |h_{1,1}| + \rho_1|h_{1,3}| & \frac{h_{1,2}h_{2,2}^*}{|h_{2,2}|} + \frac{\rho_2 h_{1,3}h_{2,3}^*}{|h_{2,3}|} \\ \frac{h_{2,1}h_{1,1}^*}{|h_{1,1}|} + \frac{\rho_1 h_{2,3}h_{1,3}^*}{|h_{1,3}|} & |h_{2,2}| + \rho_2|h_{2,3}| \end{pmatrix}^{-1}$$

$$\begin{pmatrix} |h_{1,1}| + \rho_1|h_{1,3}| & 0 \\ 0 & |h_{2,2}| + \rho_2|h_{2,3}| \end{pmatrix}$$

Note that the right hand matrix above represents a normalisation to prevent the channel inverse (which is the left hand matrix) from excessively amplifying signal components before attempting to transmit them over the physical channels. A corresponding de-normalisation is then performed by each receiver. It should be noted that embodiments of the present invention are not limited to any particular type of vectoring or normalisation methodology adopted, but rather can be used together with any appropriate form of vectoring and/or normalisation. However, in the present embodiment, the full system thus becomes:

$$\begin{pmatrix} y_1 \\ y_2 \end{pmatrix} = \begin{pmatrix} h_{1,1} & h_{1,2} & h_{1,3} \\ h_{2,1} & h_{2,2} & h_{2,3} \end{pmatrix} \begin{pmatrix} \frac{h_{1,1}^*}{|h_{1,1}|} & 0 \\ 0 & \frac{h_{2,2}^*}{|h_{2,2}|} \\ \frac{\rho_1 h_{1,3}^*}{|h_{1,3}|} & \frac{\rho_2 h_{2,3}^*}{|h_{2,3}|} \end{pmatrix}$$

$$\begin{pmatrix} |h_{1,1}| + \rho_1|h_{1,3}| & \frac{h_{1,2}h_{2,2}^*}{|h_{2,2}|} + \frac{\rho_2 h_{1,3}h_{2,3}^*}{|h_{2,3}|} \\ \frac{h_{2,1}h_{1,1}^*}{|h_{1,1}|} + \frac{\rho_1 h_{2,3}h_{1,3}^*}{|h_{1,3}|} & |h_{2,2}| + \rho_2|h_{2,3}| \end{pmatrix}^{-1}$$

$$\begin{pmatrix} |h_{1,1}| + \rho_1|h_{1,3}| & 0 \\ 0 & |h_{2,2}| + \rho_2|h_{2,3}| \end{pmatrix} \begin{pmatrix} x_1 \\ x_2 \end{pmatrix}.$$

And finally, the transmitted X is estimated at FEQs by:

$$\check{X} = \begin{pmatrix} \check{x}_1 \\ \check{x}_2 \end{pmatrix} = \begin{pmatrix} |h_{1,1}| + \rho_1|h_{1,3}| & 0 \\ 0 & |h_{2,2}| + \rho_2|h_{2,3}| \end{pmatrix}^{-1} \begin{pmatrix} y_1 \\ y_2 \end{pmatrix}$$

Signal Tracking in 16

1. After data source (1611):

$$D = \begin{pmatrix} d_1 \\ d_2 \end{pmatrix}$$

2. After M-QAM (1621):

$$X = \begin{pmatrix} x_1 \\ x_2 \end{pmatrix}$$

3. After the vectoring unit (1630):

$$\check{X} = \begin{pmatrix} \check{x}_1 \\ \check{x}_2 \end{pmatrix} = \begin{pmatrix} |h_{1,1}| + \rho_1|h_{1,3}| & \frac{h_{1,2}h_{2,2}^*}{|h_{2,2}|} + \frac{\rho_2 h_{1,3}h_{2,3}^*}{|h_{2,3}|} \\ \frac{h_{2,1}h_{1,1}^*}{|h_{1,1}|} + \frac{\rho_1 h_{2,3}h_{1,3}^*}{|h_{1,3}|} & |h_{2,2}| + \rho_2|h_{2,3}| \end{pmatrix}^{-1}$$

$$\begin{pmatrix} |h_{1,1}| + \rho_1|h_{1,3}| & 0 \\ 0 & |h_{2,2}| + \rho_2|h_{2,3}| \end{pmatrix} \begin{pmatrix} x_1 \\ x_2 \end{pmatrix}$$

Expanded to:

$$\check{X} = \begin{pmatrix} \check{x}_1 \\ \check{x}_2 \end{pmatrix} = \frac{1}{\left[ (|h_{1,1}| + \rho_1|h_{1,3}|) * (|h_{2,2}| + \rho_2|h_{2,3}|) - \left[ \left( \frac{h_{1,2}h_{2,2}^*}{|h_{2,2}|} + \frac{\rho_2 h_{1,3}h_{2,3}^*}{|h_{2,3}|} \right) * \left( \frac{h_{2,1}h_{1,1}^*}{|h_{1,1}|} + \frac{\rho_1 h_{2,3}h_{1,3}^*}{|h_{1,3}|} \right) \right] \right]}$$

$$\begin{pmatrix} |h_{2,2}| + \rho_2|h_{2,3}| & -\frac{h_{2,1}h_{1,1}^*}{|h_{1,1}|} - \frac{\rho_1 h_{2,3}h_{1,3}^*}{|h_{1,3}|} \\ -\frac{h_{1,2}h_{2,2}^*}{|h_{2,2}|} - \frac{\rho_2 h_{1,3}h_{2,3}^*}{|h_{2,3}|} & |h_{1,1}| + \rho_1|h_{1,3}| \end{pmatrix} \begin{pmatrix} |h_{1,1}| + \rho_1|h_{1,3}| & 0 \\ 0 & |h_{2,2}| + \rho_2|h_{2,3}| \end{pmatrix} \begin{pmatrix} x_1 \\ x_2 \end{pmatrix}$$

and hence, $$\check{X} = \begin{pmatrix} \check{x}_1 \\ \check{x}_2 \end{pmatrix} = \frac{1}{\left[ (|h_{1,1}| + \rho_1|h_{1,3}|) * (|h_{2,2}| + \rho_2|h_{2,3}|) - \left[ \left( \frac{h_{1,2}h_{2,2}^*}{|h_{2,2}|} + \frac{\rho_2 h_{1,3}h_{2,3}^*}{|h_{2,3}|} \right) * \left( \frac{h_{2,1}h_{1,1}^*}{|h_{1,1}|} + \frac{\rho_1 h_{2,3}h_{1,3}^*}{|h_{1,3}|} \right) \right] \right]}$$

$$\begin{pmatrix} (|h_{1,1}| + \rho_1|h_{1,3}|) * (|h_{2,2}| + \rho_2|h_{2,3}|) & (|h_{1,1}| + \rho_1|h_{1,3}|) * \left( -\frac{h_{2,1}h_{1,1}^*}{|h_{1,1}|} - \frac{\rho_1 h_{2,3}h_{1,3}^*}{|h_{1,3}|} \right) \\ (|h_{2,2}| + \rho_2|h_{2,3}|) * \left( -\frac{h_{1,2}h_{2,2}^*}{|h_{2,2}|} - \frac{\rho_2 h_{1,3}h_{2,3}^*}{|h_{2,3}|} \right) & (|h_{2,2}| + \rho_2|h_{2,3}|) * (|h_{1,1}| + \rho_1|h_{1,3}|) \end{pmatrix} \begin{pmatrix} x_1 \\ x_2 \end{pmatrix}$$

Finally:

$$\begin{pmatrix} \check{x}_1 \\ \check{x}_2 \end{pmatrix} = \begin{pmatrix} \dfrac{x_1(|h_{1,1}|+\rho_1|h_{1,3}|)*(|h_{2,2}|+\rho_2|h_{2,3}|) + x_2(|h_{1,1}|+\rho_1|h_{1,3}|)*\left(-\dfrac{h_{2,1}h_{1,1}^*}{|h_{1,1}|} - \dfrac{\rho_1 h_{2,3}h_{1,3}^*}{|h_{1,3}|}\right)}{\left[(|h_{1,1}|+\rho_1|h_{1,3}|)*(|h_{2,2}|+\rho_2|h_{2,3}|) - \left(\dfrac{h_{1,2}h_{2,2}^*}{|h_{2,2}|} + \dfrac{\rho_2 h_{1,3}h_{2,3}^*}{|h_{2,3}|}\right)*\left(\dfrac{h_{2,1}h_{1,1}^*}{|h_{1,1}|} + \dfrac{\rho_1 h_{2,3}h_{1,3}^*}{|h_{1,3}|}\right)\right]} \\[2ex] \dfrac{x_1(|h_{2,2}|+\rho_2|h_{2,3}|)*\left(-\dfrac{h_{1,2}h_{2,2}^*}{|h_{2,2}|} - \dfrac{\rho_2 h_{1,3}h_{2,3}^*}{|h_{2,3}|}\right) + x_2(|h_{2,2}|+\rho_2|h_{2,3}|)*(|h_{1,1}|+\rho_1|h_{1,3}|)}{\left[(|h_{1,1}|+\rho_1|h_{1,3}|)*(|h_{2,2}|+\rho_2|h_{2,3}|) - \left(\dfrac{h_{1,2}h_{2,2}^*}{|h_{2,2}|} + \dfrac{\rho_2 h_{1,3}h_{2,3}^*}{|h_{2,3}|}\right)*\left(\dfrac{h_{2,1}h_{1,1}^*}{|h_{1,1}|} + \dfrac{\rho_1 h_{2,3}h_{1,3}^*}{|h_{1,3}|}\right)\right]} \end{pmatrix}$$

4. After MICOP-MRC (1640)

$$\hat{X} = \begin{pmatrix} \dfrac{h_{1,1}^*}{|h_{1,1}|} & 0 \\ 0 & \dfrac{h_{2,2}^*}{|h_{2,2}|} \\ \dfrac{\rho_1 h_{1,3}^*}{|h_{1,3}|} & \dfrac{\rho_2 h_{2,3}^*}{|h_{2,3}|} \end{pmatrix} \begin{pmatrix} \check{x}_1 \\ \check{x}_2 \end{pmatrix} = \begin{pmatrix} \dfrac{\check{x}_1 h_{1,1}^*}{|h_{1,1}|} \\ \dfrac{\check{x}_2 h_{2,2}^*}{|h_{2,2}|} \\ \dfrac{\check{x}_1 \rho_1 h_{1,3}^*}{|h_{1,3}|} + \dfrac{\check{x}_2 \rho_2 h_{2,3}^*}{|h_{2,3}|} \end{pmatrix}$$

or equivalently:

$$\hat{X} = \begin{pmatrix} \dfrac{h_{1,1}^*}{|h_{1,1}|} & 0 \\ 0 & \dfrac{h_{2,2}^*}{|h_{2,2}|} \\ \dfrac{\rho_1 h_{1,3}^*}{|h_{1,3}|} & \dfrac{\rho_2 h_{2,3}^*}{|h_{2,3}|} \end{pmatrix} \begin{pmatrix} \dfrac{x_1(|h_{1,1}|+\rho_1|h_{1,3}|)*(|h_{2,2}|+\rho_2|h_{2,3}|) + x_2(|h_{1,1}|+\rho_1|h_{1,3}|)*\left(-\dfrac{h_{2,1}h_{1,1}^*}{|h_{1,1}|} - \dfrac{\rho_1 h_{2,3}h_{1,3}^*}{|h_{1,3}|}\right)}{\left[(|h_{1,1}|+\rho_1|h_{1,3}|)*(|h_{2,2}|+\rho_2|h_{2,3}|) - \left(\dfrac{h_{1,2}h_{2,2}^*}{|h_{2,2}|} + \dfrac{\rho_2 h_{1,3}h_{2,3}^*}{|h_{2,3}|}\right)*\left(\dfrac{h_{2,1}h_{1,1}^*}{|h_{1,1}|} + \dfrac{\rho_1 h_{2,3}h_{1,3}^*}{|h_{1,3}|}\right)\right]} \\[2ex] \dfrac{x_1(|h_{2,2}|+\rho_2|h_{2,3}|)*\left(-\dfrac{h_{1,2}h_{2,2}^*}{|h_{2,2}|} - \dfrac{\rho_2 h_{1,3}h_{2,3}^*}{|h_{2,3}|}\right) + x_2(|h_{2,2}|+\rho_2|h_{2,3}|)*(|h_{1,1}|+\rho_1|h_{1,3}|)}{\left[(|h_{1,1}|+\rho_1|h_{1,3}|)*(|h_{2,2}|+\rho_2|h_{2,3}|) - \left(\dfrac{h_{1,2}h_{2,2}^*}{|h_{2,2}|} + \dfrac{\rho_2 h_{1,3}h_{2,3}^*}{|h_{2,3}|}\right)*\left(\dfrac{h_{2,1}h_{1,1}^*}{|h_{1,1}|} + \dfrac{\rho_1 h_{2,3}h_{1,3}^*}{|h_{1,3}|}\right)\right]} \end{pmatrix}$$

5. Finally the transmitted signal Y is modelled as:

$$Y = \begin{pmatrix} y_1 \\ y_2 \end{pmatrix} = \begin{pmatrix} |h_{1,1}|+\rho_1|h_{1,3}| & \dfrac{h_{1,2}h_{2,2}^*}{|h_{2,2}|} + \dfrac{\rho_2 h_{1,3}h_{2,3}^*}{|h_{2,3}|} \\ \dfrac{h_{2,1}h_{1,1}^*}{|h_{1,1}|} + \dfrac{\rho_1 h_{2,3}h_{1,3}^*}{|h_{1,3}|} & |h_{2,2}|+\rho_2|h_{2,3}| \end{pmatrix} \begin{pmatrix} \check{x}_1 \\ \check{x}_2 \end{pmatrix} + \begin{pmatrix} n_1 \\ n_2 \end{pmatrix}$$

where n is the background noise.

6. At the receiver end, the configuration of the FEQ for a given line, e.g. k, is $(|h_{k,k}|+\rho_k|h_{k,3}|)^{-1}$.

Generalization of Above Equations of Cover Cases of Multiple Common Indirect Channels It will be apparent to a person skilled in the art that the above equations may be modified in a straight forward manner to cover more complex situations including an arbitrarily large number of user data streams $d_1, d_2, \ldots, d_K$, with a (generally) corresponding number of direct differential mode channels over which to transmit corresponding streams of QAM constellation points $x_1, x_2, \ldots, x_K$, an arbitrarily large number of common indirect channels $\Psi_1, \Psi_2, \ldots, \Psi_{IDC}$, where there are IDC indirect channels in total (e.g. made of M phantom channels $\varphi_1, \varphi_2, \ldots, \varphi_M$ and IDC-M crosstalk channels). In such a case, crosstalk channels can be handled in exactly the same way as phantom channels in terms of generating and using an extended channel model $H_T$ as discussed above with particular reference to phantom channels. Moreover, in such a case, a weighting value can be specified for each combination of an indirect channel and a user data stream, in respect of each tone, n, giving rise to K×IDC×N weighting values in total (although a large number of these may be set to 0).

Summary of the Methodology:

It will be apparent to persons skilled in the art from the above description that the method of operation of the system (including determining values for the weighting values) proceeds along the following lines:

1. Identify all possible indirect channels for system under consideration.
2. Initialise variables/arrays for all possible transfer functions and weighting values.
3. For each tone iterate through the following sub-steps:
   3.1. Identify possible indirect channels (in simple embodiments exclude all crosstalk differential mode channels for which tone under consideration is below a threshold associated with the highest tone that the respective receiver device (associated with the direct differential mode channel) is operable to receive data at, and set to 0 all weighting values associated with the excluded indirect channels).
   3.2. For each possible indirect channel assess crosstalk coupling strength and exclude from further consideration all channels whose crosstalk coupling is below a predetermined threshold and set weighting values to zero for all thus excluded indirect channels.
   3.3. If there are more possible phantom channels at this point than can be simultaneously (and orthogonally) transmitted onto by the system, run a phantom selection algorithm to select a subset of these possible phantoms based on estimations of the crosstalk couplings and ensuring that the selected phantoms are orthogonal to one another.
   3.4. For all remaining indirect channels to be used by the system, run weighting value determination algorithm to generate values for the weighting values associated with each remaining indirect channel, the algorithm using estimations of the crosstalk couplings between the indirect channels and each used direct channel (as detected by the associated respective receiver).

3.5. Determine pre-coding coefficients based on the determined weighting values and estimations of the various channel transfer function values (including all relevant crosstalk coupling channel transfer function values). Note that the pre-coding coefficients calculated in this step include pre-coding coefficients for pre-coding the signals to be transmitted onto the direct differential mode channels as well as the indirect channels.

4. Operate system using the coefficients calculated in step 3.5 5. Monitor channel transfer function estimations and repeat step 3 in respect of any tones for which the estimations change by more than a predetermined amount.

Note that it is possible to modify step 3.4 to also take into account levels of demand for bandwidth from the different receivers/lines when determining the weighting values and it is possible to include an additional step between steps 4 and 5 which monitors the (estimations of) level of demand and repeats step 3 if necessary based on an assessment of the levels of demand.

Also note that step 1 depends only upon a knowledge of the architecture and capabilities of the system. For example in a system in which common modes are never exploited and only first order phantom modes are capable of being exploited, if the system has three twisted pairs, there are 3 different possible (non-orthogonal) phantom mode channels and 3 different possible indirect crosstalk differential mode channels (one for each twisted pair).

The amount of change required to trigger a redetermination of the weighting values and thence associated precoding coefficients can be tuned to ensure that changes in the system are tracked reasonably well without unduly burdening the system by requiring the large number of calculations which the system must perform to be carried out at very regular intervals (which might be taxing for less powerful processors).

The invention claimed is:

1. A method of transmitting data from a transmitter device to a first, a second and a third receiver device, the receiver devices being connected to the transmitter device via a first, a second and a third pair of wires respectively, each receiver device being operable to receive signals detected as a change over time in the potential difference across the local ends of each respective pair of wires extending between the receiver and the transmitter devices, the transmitter device being operable to transmit signals onto the wires extending between the transmitter device and the receiver devices in order to transmit signals via the direct differential mode to each respective receiver, and is additionally operable to transmit signals to both receivers via a single common indirect channel, the method comprising:

measuring the extent of coupling between the common indirect channel and each of the receiver devices, determining a plurality of weighting values in dependence upon the measured extent of the couplings, transmitting a first signal via the direct differential mode over the first pair and a second signal via the direct differential mode over the second pair, and transmitting a combined signal onto the indirect channel, the combined signal comprising a weighted sum of the first and second signals, the weighting being done in accordance with the determined weighting values, and wherein each of the signals is precoded prior to being transmitted in order to pre-compensate for the expected effects of cross-talk from the other signals, and wherein the pre-coding of each signal, including the first and the second signal, is performed in dependence upon the determined weighting values, wherein a first phantom mode channel is formed using a differential signal between signals of the first and second receiver devices, a second phantom mode channel is formed using a differential signal between signals of the first and third receiver devices, and a third phantom mode channel is formed using a differential signal between signals of the second and third receiver devices, and wherein the common indirect channel is a single ended phantom mode channel selected from a set of possible phantom mode channels formed by the first, second and third phantom mode channels.

2. A method according to claim 1 wherein the weighting values are determined additionally in dependence upon the instantaneous level of demand for data to be transmitted to a respective receiver.

3. A method according to claim 2 wherein the transmitter device and the receiver devices are operating in accordance with a physical layer retransmission scheme whereby a receiver requests retransmission of received data which is irreparably damaged because of errors in the received signals or in the detected or recovered data upon receipt.

4. A method according to claim 3 wherein the demand used in determining the weighting values reflects the demand for physical layer re-transmission of data caused by errors in received data.

5. A method of transmitting data from a transmitter device to a first and a second receiver device, the receiver devices being connected to the transmitter device via a first and a second pair of wires respectively, each receiver device being operable to receive signals detected as a change over time in the potential difference across the local ends of each respective pair of wires extending between the receiver and the transmitter devices, the transmitter device being operable to transmit signals onto the wires extending between the transmitter device and the receiver devices in order to transmit signals via the direct differential mode to each respective receiver, and is additionally operable to transmit signals to both receivers via a single common indirect channel, the method comprising:

measuring the extent of coupling between the common indirect channel and each of the receiver devices, determining a plurality of weighting values in dependence upon the measured extent of the couplings, transmitting a first signal via the direct differential mode over the first pair and a second signal via the direct differential mode over the second pair, and transmitting a combined signal onto the indirect channel, the combined signal comprising a weighted sum of the first and second signals, the weighting being done in accordance with the determined weighting values, and wherein each of the signals is precoded prior to being transmitted in order to pre-compensate for the expected effects of cross-talk from the other signals, and wherein the pre-coding of each signal, including the first and the second signal, is performed in dependence upon the determined weighting values, wherein the method further comprises monitoring one or more metrics associated with the operation of the system and performing a redetermination of at least some of the weighting values and associated precoding coefficients in the event that, as a result of the monitoring, one or more monitored metric is observed to have changed by more than a predetermined threshold amount since last determining or re-determining the weighting values.

6. A method according to claim 5 wherein the monitored metric comprises one or more of channel transfer function estimations and levels of demand for data to be transmitted.

7. A method of transmitting data from a transmitter device to a first and a second receiver device, the receiver devices being connected to the transmitter device via a first and a second pair of wires respectively, each receiver device being operable to receive signals detected as a change over time in the potential difference across the local ends of each respective pair of wires extending between the receiver and the transmitter devices, the transmitter device being operable to transmit signals onto the wires extending between the transmitter device and the receiver devices in order to transmit signals via the direct differential mode to each respective receiver, and is additionally operable to transmit signals to both receivers via a single common indirect channel, the method comprising:
measuring the extent of coupling between the common indirect channel and each of the receiver devices,
determining a plurality of weighting values in dependence upon the measured extent of the couplings,
transmitting a first signal via the direct differential mode over the first pair and a second signal via the direct differential mode over the second pair, and
transmitting a combined signal onto the indirect channel, the combined signal comprising a weighted sum of the first and second signals, the weighting being done in accordance with the determined weighting values, and
wherein each of the signals is precoded prior to being transmitted in order to pre-compensate for the expected effects of cross-talk from the other signals,
wherein the pre-coding of each signal, including the first and the second signal, is performed in dependence upon the determined weighting values, and
wherein the manner in which the weighting values are used to affect the first and second signals and the manner in which the combined signal is generated for transmission over the common indirect channel is performed in such a way that by assigning zero to all of the weighting values for a particular tone, the method reverts to a vectoring technique, for any such tone, in which the first and second signals are transmitted only onto their respective direct differential mode channels, and those signals are pre-coded to pre-compensate for the expected cross-talk effects of the signal being transmitted onto the other direct differential mode channel associated with the respective other pair of wires.

8. A method according to claim 1 wherein an indirect channel which is formed from a direct differential mode of transmission over a pair of wires connected between the transmitter device and the third receiver device is used to transmit a combined signal comprising a weighted sum of the first and second signals at a tone which is not used for transmissions between the transmitter and the third receiver device but is used for transmissions between the transmitter and the first and second receiver devices.

9. A method according to claim 1 wherein the first signal is generated in dependence upon: user data to be transmitted to the first receiver device; channel estimations of the first direct differential mode channel; channel estimations of the indirect channel between the transmitter and the first receiver device via the second direct differential mode channel; channel estimations of the extent of mode conversion coupling between the single ended phantom channel and the first direct differential mode channel as detected by the first receiver device; and at least some of the weighting values.

10. A method according to claim 1 wherein at least some of the weighting values take values intermediate between zero and one.

11. A transmitter device for transmitting data from the transmitter device to a first and a second receiver device, the receiver devices being connected, in use, to the transmitter device via a first and a second pair of wires respectively, each receiver device being operable to receive signals detected as a change over time in the potential difference across the local ends of each respective pair of wires extending between the respective receiver device and the transmitter device, the transmitter device being operable to transmit signals onto the wires extending between the transmitter device and the receiver devices in order to transmit signals via a direct differential mode to each respective receiver device via its respective pair of wires, and is additionally operable to transmit signals to both receiver devices via a single common indirect channel, the transmitter comprising:
a channel estimator for estimating the extent of coupling between the common indirect channel and each of the receiver devices based on readings received by the transmitter device from the receiver devices; and
a processor for determining a plurality of weighting values in dependence upon the estimated extents of the couplings;
the transmitter being operable to transmit a first signal via the direct differential mode over the first pair, to transmit a second signal via the direct differential mode over the second pair and to transmit a combined signal onto the indirect channel,
wherein the combined signal comprises a weighted sum of the first and second signals, the weighting being done in accordance with the determined weighting values;
wherein the transmitter further comprises a precoder for precoding the first, second and combined signals to pre-compensate them for the expected effects of cross-talk from the other ones of these signals,
wherein the pre-coding of each signal, including the first and the second signals, is performed in dependence upon the determined weighting values,
wherein a first phantom mode channel is formed using a differential signal between signals of the first and second receiver devices, a second phantom mode channel is formed using a differential signal between signals of the first and third receiver devices, and a third phantom mode channel is formed using a differential signal between signals of the second and third receiver devices, and
wherein the common indirect channel is a single ended phantom mode channel selected from a set of possible phantom mode channels formed by the first, second and third phantom mode channels.

12. A non-transitory carrier medium carrying computer processor implementable instructions, which upon execution by the computer processor, execute the method of claim 1.

13. A transmitter device for transmitting data from the transmitter device to a first and a second receiver device, the receiver devices being connected, in use, to the transmitter device via a first and a second pair of wires respectively, each receiver device being operable to receive signals detected as a change over time in the potential difference across the local ends of each respective pair of wires extending between the respective receiver device and the transmitter device, the transmitter device being operable to transmit signals onto the wires extending between the transmitter device and the receiver devices in order to transmit signals via a direct differential mode to each respective receiver device via its respective pair of wires, and is additionally operable to transmit signals to both receiver devices via a single common indirect channel, the transmitter comprising:

a channel estimator for estimating the extent of coupling between the common indirect channel and each of the receiver devices based on readings received by the transmitter device from the receiver devices; and a processor for determining a plurality of weighting values in dependence upon the estimated extents of the couplings;

the transmitter being operable to transmit a first signal via the direct differential mode over the first pair, to transmit a second signal via the direct differential mode over the second pair and to transmit a combined signal onto the indirect channel, wherein the combined signal comprises a weighted sum of the first and second signals, the weighting being done in accordance with the determined weighting values, wherein the transmitter further comprises a precoder for precoding the first, second and combined signals to pre-compensate them for the expected effects of cross-talk from the other ones of these signals, wherein the pre-coding of each signal, including the first and the second signals, is performed in dependence upon the determined weighting values, and wherein the transmitter device is further being operable to monitor one or more metrics associated with the operation of the system and performing a redetermination of at least some of the weighting values and associated precoding coefficients in the event that, as a result of the monitoring, one or more monitored metric is observed to have changed by more than a predetermined threshold amount since last determining or re-determining the weighting values.

14. The transmitter device according to claim 13 wherein the monitored metric comprises one or more of channel transfer function estimations and levels of demand for data to be transmitted.

15. A transmitter device for transmitting data from the transmitter device to a first and a second receiver device, the receiver devices being connected, in use, to the transmitter device via a first and a second pair of wires respectively, each receiver device being operable to receive signals detected as a change over time in the potential difference across the local ends of each respective pair of wires extending between the respective receiver device and the transmitter device, the transmitter device being operable to transmit signals onto the wires extending between the transmitter device and the receiver devices in order to transmit signals via a direct differential mode to each respective receiver device via its respective pair of wires, and is additionally operable to transmit signals to both receiver devices via a single common indirect channel, the transmitter comprising:

a channel estimator for estimating the extent of coupling between the common indirect channel and each of the receiver devices based on readings received by the transmitter device from the receiver devices; and a processor for determining a plurality of weighting values in dependence upon the estimated extents of the couplings;

the transmitter being operable to transmit a first signal via the direct differential mode over the first pair, to transmit a second signal via the direct differential mode over the second pair and to transmit a combined signal onto the indirect channel, wherein the combined signal comprises a weighted sum of the first and second signals, the weighting being done in accordance with the determined weighting values, wherein the transmitter further comprises a precoder for precoding the first, second and combined signals to pre-compensate them for the expected effects of cross-talk from the other ones of these signals, wherein the pre-coding of each signal, including the first and the second signals, is performed in dependence upon the determined weighting values, and wherein the manner in which the weighting values are used to affect the first and second signals and the manner in which the combined signal is generated for transmission over the common indirect channel is performed in such a way that by assigning zero to all of the weighting values for a particular tone, the method reverts to a vectoring technique, for any such tone, in which the first and second signals are transmitted only onto their respective direct differential mode channels, and those signals are pre-coded to pre-compensate for the expected cross-talk effects of the signal being transmitted onto the other direct differential mode channel associated with the respective other pair of wires.

* * * * *